(12) United States Patent
Tang et al.

(10) Patent No.: US 7,831,731 B2
(45) Date of Patent: Nov. 9, 2010

(54) METHOD AND SYSTEM FOR A MODULAR TRANSMISSION CONTROL PROTOCOL (TCP) RARE-HANDOFF DESIGN IN A STREAMS BASED TRANSMISSION CONTROL PROTOCOL/INTERNET PROTOCOL (TCP/IP) IMPLEMENTATION

(75) Inventors: Wenting Tang, Mountain View, CA (US); Ludmila Cherkasova, Sunnyvale, CA (US); Lance Warren Russell, Hollister, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2104 days.

(21) Appl. No.: 09/880,631

(22) Filed: Jun. 12, 2001

(65) Prior Publication Data

US 2002/0188740 A1    Dec. 12, 2002

(51) Int. Cl.
  *G06F 15/16*   (2006.01)
  *G06F 15/177*  (2006.01)
  *G06F 15/173*  (2006.01)
(52) U.S. Cl. ............... 709/237; 709/222; 709/223; 709/227; 709/228
(58) Field of Classification Search ........... 709/201, 709/227, 223, 232, 235, 238, 244, 237, 222, 709/228
See application file for complete search history.

(56) References Cited

U.S. PATENT DOCUMENTS

| | | | | |
|---|---|---|---|---|
| 5,774,660 A * | 6/1998 | Brendel et al. | ............ | 709/201 |
| 6,006,264 A * | 12/1999 | Colby et al. | ............ | 709/226 |
| 6,047,323 A * | 4/2000 | Krause | ............ | 709/227 |
| 6,182,139 B1 * | 1/2001 | Brendel | ............ | 709/226 |
| 6,601,101 B1 * | 7/2003 | Lee et al. | ............ | 709/227 |
| 6,742,044 B1 * | 5/2004 | Aviani et al. | ............ | 709/235 |
| 6,760,775 B1 * | 7/2004 | Anerousis et al. | ............ | 709/238 |
| 6,775,692 B1 * | 8/2004 | Albert et al. | ............ | 709/207 |
| 6,820,117 B1 * | 11/2004 | Johnson | ............ | 709/223 |
| 7,062,642 B1 * | 6/2006 | Langrind et al. | ............ | 713/1 |
| 7,272,640 B1 * | 9/2007 | Kazemi et al. | ............ | 709/218 |
| 7,483,967 B2 * | 1/2009 | Kim | ............ | 709/223 |
| 2002/0056006 A1 * | 5/2002 | Vange et al. | ............ | 709/235 |
| 2002/0103857 A1 * | 8/2002 | Soderberg et al. | ............ | 709/203 |

(Continued)

OTHER PUBLICATIONS

Wang, Limin, Implementation Issue: TCP Handoff, Feb. 2000, pp. 1.*

(Continued)

*Primary Examiner*—Ario Etienne
*Assistant Examiner*—Gregory G Todd

(57) ABSTRACT

A method and system for handing-off TCP states in a communication network. Specifically, the present invention allows for handing-off TCP states between nodes in an associated network that is optimized for rare handoff of TCP states. The handoff occurs between dynamically loadable modules that wrap around the TCP/IP stack located at a front-end node and a selected back-end web server. A handoff protocol implemented by the loadable modules works within the kernel level of the existing TCP/IP code. As such, no changes to the existing TCP/IP code is necessary. The loadable modules at the front-end are able to select a back-end web server depending on the content of the web request, coordinate handing off TCP states, and forward packets to the back-end web server. Loadable modules at the selected back-end modify response packets going out to reflect the proper TCP state of the front-end node.

32 Claims, 16 Drawing Sheets

U.S. PATENT DOCUMENTS

2002/0143954 A1* 10/2002 Aiken et al. ................ 709/227
2003/0237016 A1* 12/2003 Johnson et al. ................ 714/4

OTHER PUBLICATIONS

TCP Handoff, Aug. 2002, pp. 1-2.*
Vivek Pai et al., Locality-Aware Request Distribution in Cluster-based Network Servers, ACM, 1998, pp. 1-12.*
Andrew Tanenbaum, "Computer Network: Third Edition,", Prentice Hall, New Jersey, 1996, pp. 529-533.*
Vivek S. Pai, Mohit Aron, Gaurav Banga, Michael Svendsen, Peter Druschel, Willy Zwaenepoel and Erich Nahum, Locality-Aware Request Distribution in Cluster-Based Network Servers, Department of Electrical and Computer Engineering, Rice University, Department of Computer Science, Rice University, IBM T.J. Watson Research Center, ACM, Oct. 1998, pp. 205-216.

* cited by examiner

METHOD AND SYSTEM FOR A MODULAR TRANSMISSION CONTROL PROTOCOL (TCP) RARE-HANDOFF DESIGN IN A STREAMS BASED TRANSMISSION CONTROL PROTOCOL/INTERNET PROTOCOL (TCP/IP) IMPLEMENTATION

BACKGROUND OF THE INVENTION

1. Field of the Invention

The present invention relates to the field of STREAMS-based Transmission Control Protocol/Internet (TCP/IP) protocols. Specifically, the present invention relates to the field of modular implementation of the TCP handoff protocol in order to facilitate the transfer or migration of TCP states from one node to another node in a communication network. The present invention further relates to the field of content-aware request distribution in a web server cluster.

2. Related Art

Web server clusters are the most popular configurations used to meet the growing traffic demands imposed by the Internet. However, for web server clusters to be able to achieve scalable performance, when the cluster size increases, it is imperative that the cluster employs some mechanism and/or policy for balanced request distribution. For instance, it is important to protect web server clusters from network overload and to provide service differentiation when different client requests compete for limited server resources. Mechanisms for intelligent request distribution and request differentiation help to achieve scalable and predictable cluster performance and functionality, which are essential for today's Internet web sites.

Traditional request distribution methods try to distribute the requests among the nodes in a web cluster based on certain parameters, such as, IP addresses, port numbers, and load information. Some of these request distribution methods have the ability to check the packet header up to Layer 4 in the International Organization for Standardization Open Systems Interconnection (ISO/OSI) network reference model (e.g., TCP/IP) in order to make the distribution decision. As such, these methods are commonly referred to as Layer 4 request distributions.

FIG. 1 shows a communication network 100 of the prior art that illustrates a load balancing solution. In FIG. 1, a web server cluster 150 is shown. The cluster 150 can be a web site with a virtual IP address located at the load balancer 152. Various back-end web servers, such as back-end web server-1 155, back-end web server-2 157, on up to back-end web server-n 159 contain the content provided by the web site.

Typically, the load-balancer 152 sits as a front-end node on a local network and acts as a gateway for incoming connections. The load balancer 152 is also called a request distributor 152. Requests for content can come through the Internet 120 from various clients, such as client-1 110, client-2 112, on up to client-n 114. Incoming client requests are distributed, more or less, evenly to the pool of back-end web servers, without regard to the requested content. Further, the load balancer 152 forwards client requests to selected back-end web servers prior to establishing a connection with the client.

The three-way handshaking and the connection set up with the original client is the responsibility of the back-end web server. After the connection is established, the client sends to the back-end web server the HTTP request with the specific URL for retrieval.

In this configuration, the web server cluster 150 appears as a single host to the clients. To the back-end web servers in a web cluster 150, the front-end load-balancer 152 appears as a gateway. In essence, it intercepts the incoming connection establishment packets and determines which back-end web server should process a particular request. Proprietary algorithms implemented in the front-end load balancer 152 are used to distribute the requests. These algorithms can take into account the number of back-end web servers available, the resources (CPU speed and memory) of each back-end web server, how many active TCP sessions are being serviced, etc. The balancing methods across different load-balancing servers vary, but in general, requests are forwarded to the least loaded back-end web server in the cluster 150.

In addition, only the virtual address located at the load balancer 152 is advertised to the Internet community, so the load balancer also acts as a safety net. The IP addresses of the individual back-end web servers are never sent back to the web browser located at the client making a request, such as client 110. The load-balancer rewrites the virtual cluster IP address to a particular web server IP address using Network Address Translation (NAT).

However, because of this IP address rewriting, both inbound requests and outbound responses must pass through the load-balancer 152. This creates a bottleneck and limits the scalability of the cluster 150.

A better method for web request distribution takes into account the content (such as URL name, URL type, or cookies) of an HTTP web request when making a routing decision to a web server. The main technical difficulty of this approach is that it requires the establishment of a connection between the client and the request distributor. After the connection is established, the client sends the HTTP web request to a request distributor, which decides which web server to forward the HTTP web request for processing.

In this approach, the three-way handshaking protocol and the connection set up between the client and the request distributor happens first as shown in Prior Art FIG. 2. A request distributor 240 sets up the connection with the client (e.g., client-1 210). After that, a back-end web server (e.g., web server-1 232) is chosen by the request distributor 240 based on the content of the HTTP web request from the client-1 210. The request distributor 240 can be located at a front-end node that accesses a web cluster 230 containing a plurality of web servers, such as web server-1 232, web server-2 234, on up to web server-n 236.

In the Internet environment, the hypertext transfer protocol (HTTP) protocol is based on the connection-oriented TCP protocol. In order to serve a client request, a TCP connection must first be established between a client and a server node. If the front-end node cannot or should not serve the request, some mechanism is needed to forward the request for processing to the right node in the web cluster.

The TCP handoff mechanism allows distribution of HTTP web requests on the basis of requested content and the sending of responses directly to the client-1 210. In this mechanism, the request distributor 240 transfers TCP states from the request distributor 240 to the selected back-end web server 232.

Previously, various mechanisms for transferring TCP states were implemented, including using a separate proprietary protocol at the application layer of an operating system. For example, in the Brendel et al. patent (U.S. Pat. No. 5,774,660), incoming packets to the front-end node have their protocol changed from TCP/IP protocol to a non-TCP/IP standard that is only understood by the proprietary protocol located at the application layer. Later, the packets are changed back to the TCP/IP protocol for transmission to the back-end web server. Thus, the Brendel et al. patent reduces processing efficiency by switching back and forth between the user-level and kernel level layers of the operating system.

Thus, a need exists for a more efficient design for implementing a mechanism for transferring TCP states in a web server cluster.

SUMMARY OF THE INVENTION

Accordingly, a method and system for a method and system for a modular Transmission Control Protocol (TCP) rare-handoff design in a STREAMS-based Transmission Control Protocol/Internet Protocol (TCP/IP) implementation is described. Embodiments of the present invention provide for better management flexibility as TCP handoff (STREAMS) modules can be dynamically loaded and unloaded as dynamically loadable kernel modules (DLKM) without service interruption. In addition, embodiments of the present invention provides for better portability between different operating systems since the TCP handoff modules can be ported to other STREAMS-based TCP/IP protocol implementation. Also, embodiments of the present invention provides for upper layer transparency in that no application modifications are necessary to take advantage of new solutions: modifications are made at the kernel level in the DLKM TCP handoff modules without modifying the operating system. Further, embodiments of the present invention meet provides for better efficiency in processing web requests since the handoff modules only peek into message traffic with minimum functional replication of the original TCP/IP modules.

These and other objects and advantages of the present invention will no doubt become obvious to those of ordinary skill in the art after having read the following detailed description of the preferred embodiments which are illustrated in the various drawing figures.

Specifically, the present invention discloses a method and system for routing web requests between cooperative nodes either locally or in a wide area network. The routing is implemented by handing off TCP states between the cooperative web server nodes. The cluster of associated web servers contain content that might be partitioned or replicated between each of the associated servers. The web cluster could be a web site that is coupled to a communication network, such as the Internet.

The handoff mechanism is designed around the network architecture of the web cluster. The present invention assumes that handoffs are rare, in that web requests received at a node will usually be processed at that node in the web cluster, in accordance with one embodiment of the present invention. In the event that web requests are processed remotely, every server in a cluster may consult a mapping table that allows selection of the proper server in the cluster based on the content of the web request. The proposed design is optimized to minimize the overhead in the TCP handoff mechanism when web requests are processed locally.

Every node or server computer in the web cluster is homogeneously structured in order to implement the TCP handoff mechanism. Each node can operate as a front-end node that receives a web request, or as a remotely located back-end web server node that receives a forwarded web request for processing. TCP handoff modules determine if the web request will be processed locally or remotely. If processed locally, the TCP handoff modules at the front-end node release connection setup messages and forward packets upstream to the web server application. If handled remotely, the TCP handoff modules initiate the TCP handoff process, migrate the TCP states, forward data packets, and close all connections when the communication session is closed.

The process begins by establishing a connection between a client web browser and a front-end node. The front-end node could be selected by round-robin DNS, or by a Layer 4 switch. The front-end node completes the TCP three-way handshaking protocol to establish a connection for the communication session. A bottom TCP (BTCP) handoff (STREAMS) module located below the TCP module in the operating system at the front-end node monitors the connection process and stores the connection messages for TCP state migration purposes.

The connection establishes a communication session between the client and the front-end node for the transfer of data contained within content in the web cluster. The content can be completely or partially partitioned between each of the nodes that comprise the web cluster.

The TCP handoff mechanism is transparent to applications at the front-end node. As such, the connection should not be exposed to user level applications before any routing decision is made. Connection indication messages sent to the application layer are intercepted and held at an upper TCP (UTCP) module located above the TCP module at the front-end node.

After the connection is made, the client sends a HTTP request to the front-end node. The front-end node determines if the web request will be handled locally or remotely by another web server in the cluster. This is accomplished by the TCP handoff modules. The BTCP handoff module at the front-end node intercepts and parses the HTTP request. The BTCP module examines the content of the HTTP request to determine which of the web servers in the cluster is capable of or is most appropriate for processing the request.

If the local web server at the front-end node is best suited to handle the web request, the BTCP module at the front-end node notifies the UTCP module to release the connection indication message to the upper modules. Then the BTCP module sends incoming packets, including the HTTP request, upstream as quickly as possible without any extra processing overhead.

If a remote web server at a back-end web server is assigned to process the web request, the BTCP module at the front-end node initiates a handoff request with the selected back-end web server through a persistent connection. Each of the UTCP modules at each of the server nodes are coupled to the persistent TCP control channel. As such, one UTCP module can communicate with another UTCP module at another node. Similarly, TCP handoff modules at one node can communicate with other TCP handoff modules at other nodes.

TCP state migration between the two nodes allows the BTCP modules at both the front-end node and the back-end web server to understand the correct TCP states and IP addresses for messages sent out of both nodes. These message or data packets associated with the communication session can be updated to reflect proper TCP states and properly directed to the correct IP address depending on where the packets originated from and where they are received.

State migration is conducted by the TCP handoff modules at both the front-end and selected back-end web servers with a TCP handoff protocol, in accordance with one embodiment of the present invention. The BTCP module of the front-end node sends a handoff request message over the control channel to the BTCP module of the selected back-end web server. The handoff message includes initial TCP state information associated with the front-end node, and the original connection messages used to establish the communication session between the client and the front-end node.

At the back-end web server, the BTCP module replays the connection messages in order to migrate the TCP state of the front-end node and to obtain the TCP state of the back-end web server. The BTCP module sends a handoff acknowledgment packet back to the front-end node over the control channel. The acknowledgment packet contains initial TCP state information of the back-end web server. In this way, both the front-end node and the back-end web server understand the proper TCP states and destination addresses to conduct the communication session. The client as well as the upper application layers of the front-end node are transparent to the process of state migration and handoff.

After successful handoff of the TCP states between the front-end node and the selected back-end web server, the BTCP module at the front-end node enters into a forwarding mode. As such, incoming packets coming from the client to the front-end node are updated to reflect the proper TCP state of the selected back-end web server, properly re-addressed, and forwarded to the selected back-end web server. Updating of the TCP states is necessary since the message, originally configured to reflect the TCP state of the front-end node, is being forwarded to the selected back-end web server whose TCP state is most likely different from that of the front-end node.

Similarly, response packets from the selected back-end web server are also updated by BTCP module at that back-end web server to reflect the proper TCP state of the front-end node before being sent to the client. Updating is necessary since the client expects packets to reflect TCP states related to the connection made between the client and the front-end node. In this way, response packets from the back-end web server can be directly sent to the client through a communication path that does not include the front-end node.

Termination of the communication session should free TCP states at both the front-end node and the back-end web server. Data structures at the selected back-end web server are closed by the TCP/IP STREAMS mechanism. The BTCP module at the selected back-end web server monitors the handoff connection and the TCP/IP message traffic and notifies the BTCP module at the front-end node through the control channel when the communication session is closed. The BTCP module at the front-end node then releases the resources related to the forwarding mechanism.

BRIEF DESCRIPTION OF THE DRAWINGS

PRIOR ART

PRIOR ART

DETAILED DESCRIPTION OF THE INVENTION

Figure 1:
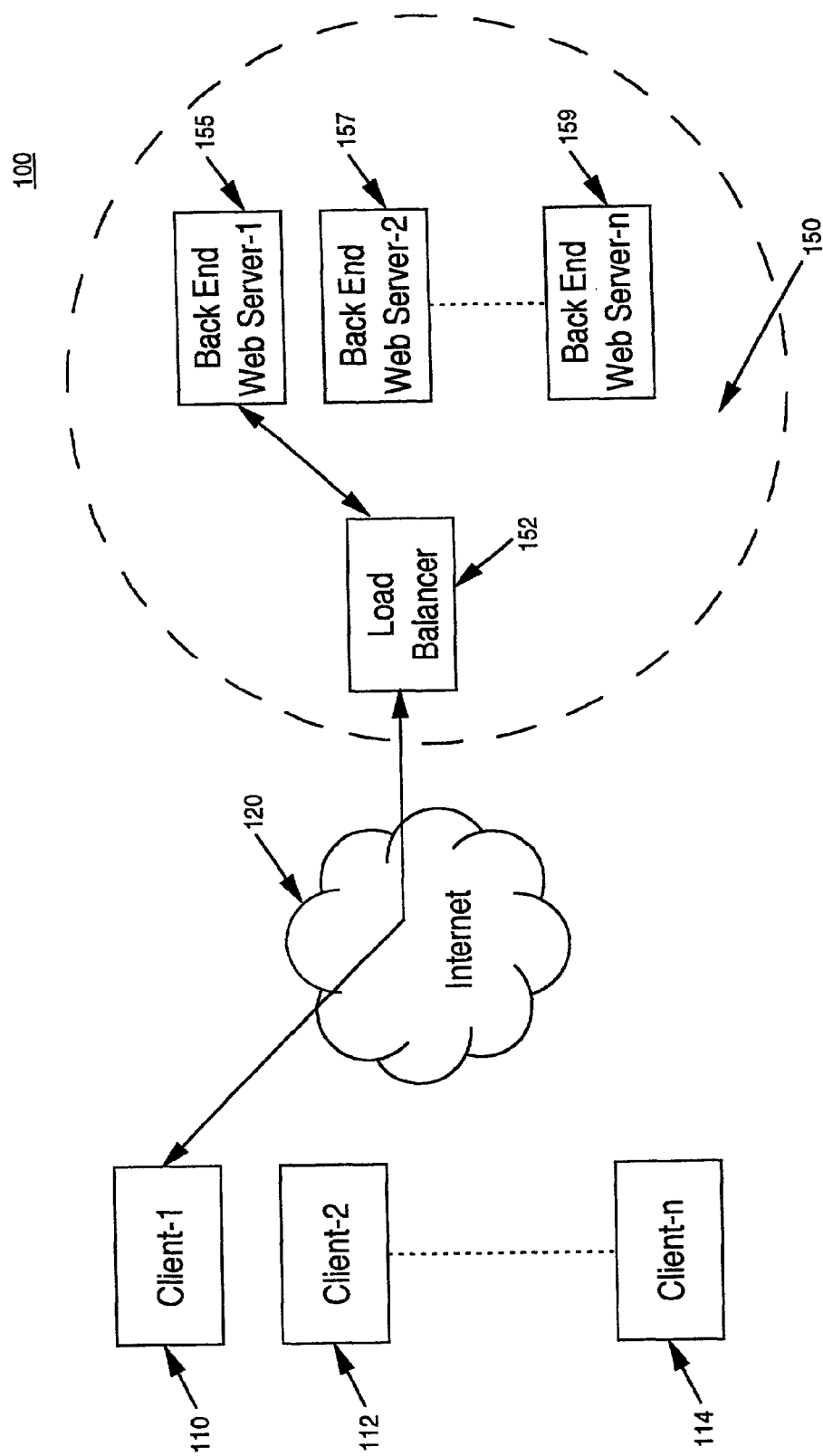
FIG. 1 illustrates a block diagram of an exemplary communication network implementing traditional load balancing solutions.
Figure 2:
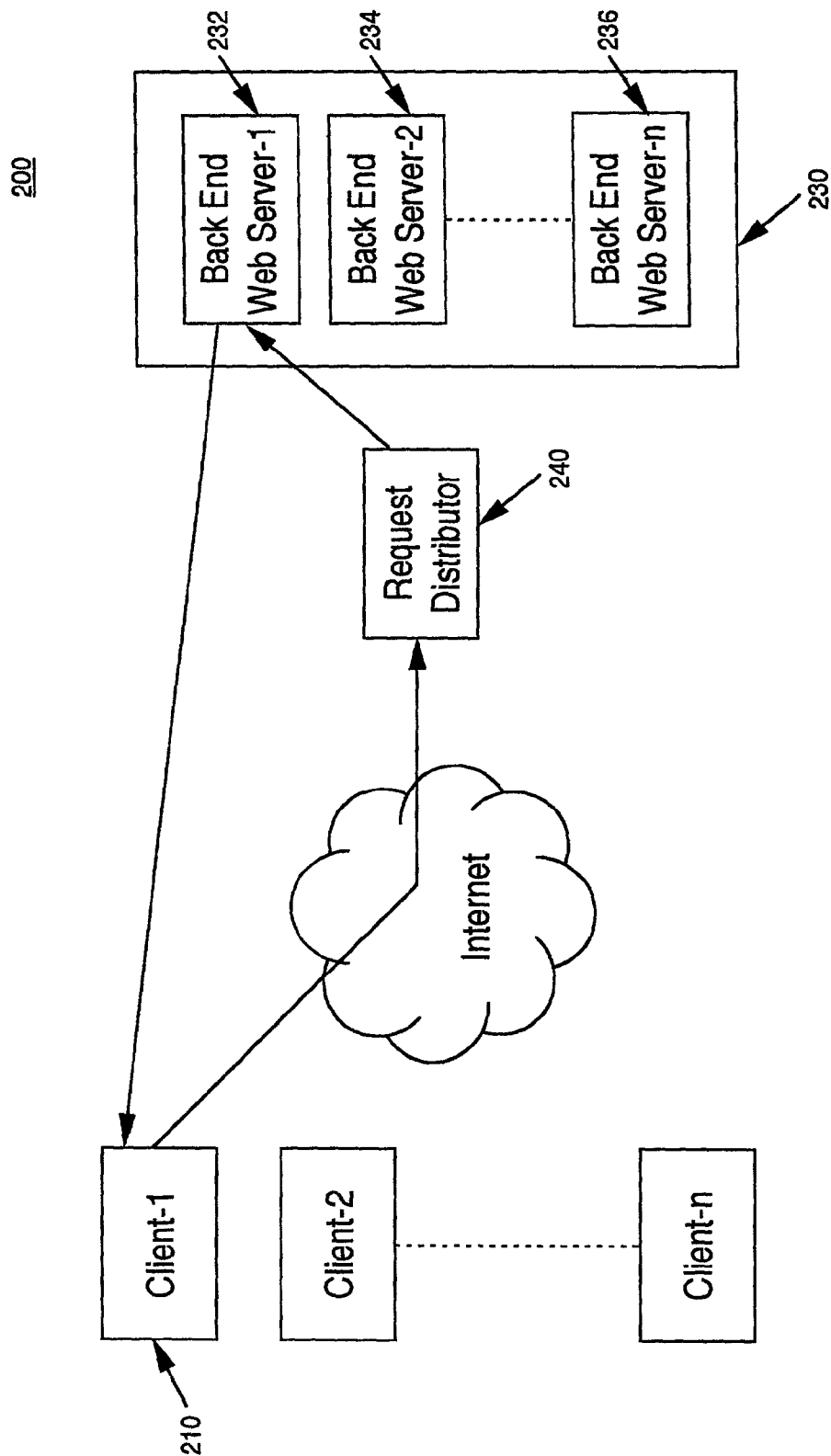
FIG. 2 illustrates a block diagram of a communication network environment that is able to examine the content of a web request for distribution.

Reference will now be made in detail to the preferred embodiments of the present invention, a method and system for implementing TCP rare-handoff in a STREAMS-based TCP/IP implementation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, a method and system for a modular Transmission Control Protocol (TCP) rare-handoff design in a STREAMS-based Transmission Control Protocol/Internet Protocol (TCP/IP) implementation is described. Embodiments of the present invention provide for better management flexibility as TCP handoff (STREAMS) modules can be dynamically loaded and unloaded as dynamically loadable kernel modules (DLKM) without service interruption. In addition, embodiments of the present invention provide better portability between different operating systems since the TCP handoff modules can be ported to other STREAMS-based TCP/IP operating systems implementing the TCP/IP protocol. Also, embodiments of the present invention provide for upper layer transparency in that no application modifications are necessary to take advantage of new solutions: modification are made at the kernel level in the DLKM TCP handoff modules without modifying the operating system. Further, embodiments of the present invention provide for better efficiency in processing web requests since the handoff modules only peek into message traffic with minimum functional replication of the original TCP/IP modules.

Content Aware Request Distribution

Content-aware request distribution takes into account the content (URL name, URL type, or cookies, etc.) when making a decision as to which back-end web server can best process the HTTP request. Content-aware request distribution mechanisms enable smart, specially tailored routing inside the web cluster.

Some benefits achieved in content-aware request distribution include allowing only partial replication of the content for a web site. Most, if not all, of the content provided by a web site server cluster can be completely partitioned. Additionally, the web site can further partition content based on specialization of information. For example, dedicated web servers can be set up to deliver different types of documents. Another benefit provided by content-aware distribution includes support for differentiated Web Quality of Service (Web QoS).

Content-aware request distribution based on cache affinity lead to significant performance improvements compared to strategies that only take into account load information.

Three main components comprise a web server cluster configuration in implementing a content-aware request distribution strategy: a dispatcher, a distributor, and a web server. The dispatcher implements the request distribution strategy and decides which web server will be processing a given request. The distributor interfaces with the client and implements the TCP handoff in order to distribute the client requests to a specific web server. The web server processes the client requests, or HTTP requests.

In the Internet environment, the hypertext transfer protocol (HTTP) protocol is based on the connection-oriented TCP protocol. In order to serve a client request, a TCP connection is first established between a client and a front-end node. A dispatcher component is accessed by the front-end node to determine which web server can process the web request. The dispatcher component may be located at the front-end node. A web server at the front-end node may be selected in which case, local processing of the web request occurs at the front-end node.

However, if the selected web server is not located at the front-end node, some mechanism is needed to forward the web request for processing to the right node in the web cluster. In this case, a distributor component supports the handing off of TCP states between the front-end node to the selected web server located at another node, a back-end web server, in the web cluster. Hence, the selected web server can also be referred to as the back-end web server.

Figure 3:
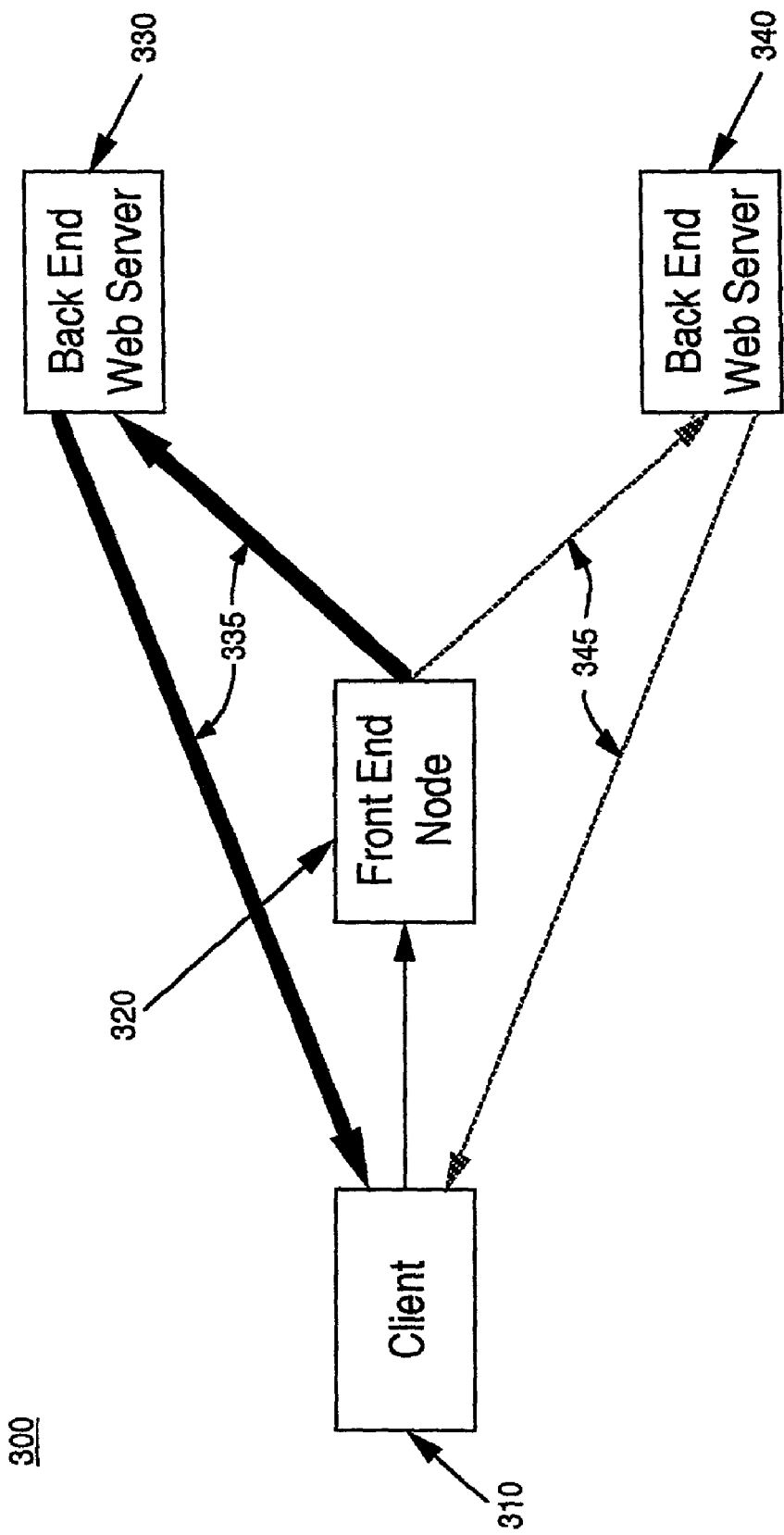
FIG. 3 illustrates a block diagram of an exemplary communication network environment including a front-end node coupled to a back-end web server for implementing a modular Transmission Control Protocol (TCP) handoff design in a STREAMS-based Transmission Control Protocol/Internet Protocol (TCP/IP) implementation, in accordance with one embodiment of the present invention.

The TCP handoff mechanism enables the forwarding of back-end web server responses directly to the clients without passing through the front-end node. FIG. 3 illustrates an exemplary network 300 implementing the content-aware request distribution implementing a TCP rare-handoff protocol, in accordance with one embodiment of the present invention.

The main idea behind the TCP rare-handoff mechanism is to migrate the created TCP state from the distributor in the front end node 320 to the back-end web server (e.g., 330 or 340). The TCP handoff protocol supports creating a TCP connection at the back-end web server without going through the TCP three-way handshake with the client. Similarly, an operation is required that retrieves the state of an established connection and destroys the connection state without going through the normal message handshake required to close a TCP connection. Once the connection is handed off to the back-end web server, the front-end must forward packets from the client to the appropriate back-end web server.

The TCP rare-handoff mechanism allows for response packets from the back-end web server to be sent directly to the client in a communication path that does not include the front-end node. For example, communication path 335 illustrates how a web request is sent from the front-end to the back-end web server. After the web request is processed, path 325 shows the response packet going directly from the back-end web server to the client 310. Also, the front-end node can access many back-end web servers for servicing the web request. Communication path 345 shows another web request flow path where response packets from back-end web server 340 are sent directly to the client 310.

Figure 4:
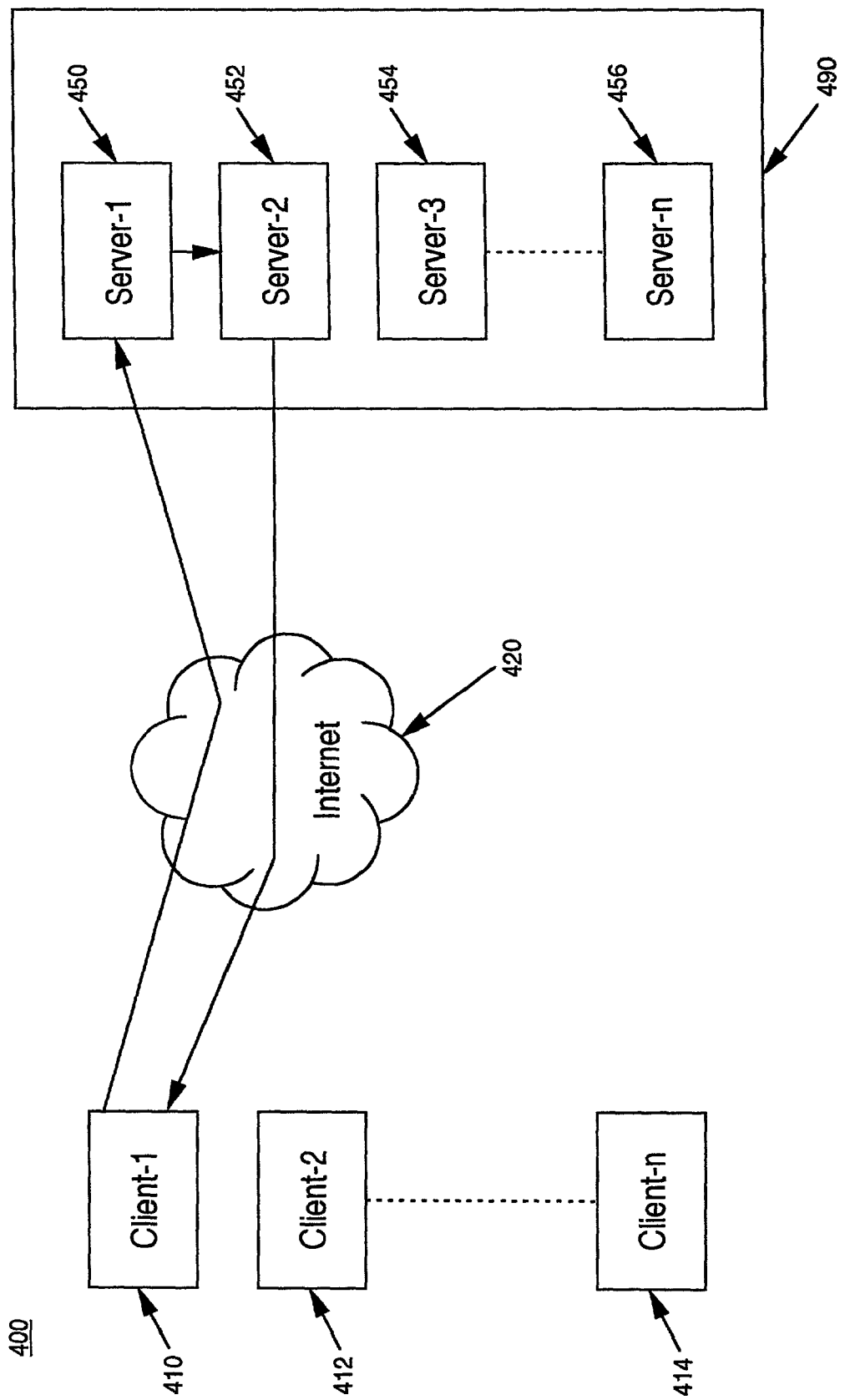
FIG. 4 illustrates a block diagram of an exemplary communication network environment showing the connections between a front-end node of a web cluster and a selected back-end web server of the web server cluster for a communication session established through the TCP handoff design, in accordance with one embodiment of the present invention.

The difference in the response flow route for the TCP handoff mechanism allows for substantially higher scalability. For example, a network architecture 400 that implements the TCP handoff mechanism is shown in FIG. 4. Embodiments of the present invention consider a web cluster in which the content-aware distribution is performed by each node in a web cluster. Thus, each server in a cluster may forward a request to another node based on the request content using the TCP rare-handoff mechanism.

The architecture 400 is illustrative of content-aware request distribution (CARD) architectures where the distributor is co-located with the web server. Architectures implementing a Locality-Aware Request Distribution (LARD) policy when distributing web requests allow for increased scalability of the system. The LARD policy is outlined in a paper by Pai et al. titled: Locality-Aware Request Distribution in Cluster-Based Network Servers, Proceedings of the 8th International Conference on Architectural Support for Programming Languages and Operating Systems (ASPLOS VIII), ACM SIG PLAN, 1998, pp. 205-216. This is especially true when the system logically partitions documents among the cluster nodes by optimizing the usage of the overall cluster RAM memory. This enables different requests for a particular document to be served by the same node. This node most likely has the requested file in its RAM memory.

FIG. 4 also is illustrative of the traffic flow between clients and a web cluster 490 defined by web server-1 450, web server-2 452, web server-3 454, on up to web server-n 456. Network 400 also includes client-1 410, client-2 412, on up to client-n 414. The clients are coupled to the web cluster 490 via the Internet 420.

The Internet 420 provides the network for passing traffic from each of the clients to the web cluster 490. For simplicity, it is assumed that the clients directly contact the distributor at one of the nodes in the cluster 490, the front-end node (e.g., server-1 450). The front-end node may be selected, for instance, via a round-robin DNS mechanism. For example, client-1 410 sends a request to server-1 450 through the Internet 420. Server-1 450 acts as the front-end node in this case. After the front-end node 450 establishes the connection with the client 410, and the request distribution decision is made, the established connection is handed off to the selected back-end web server (web server-2 452) to service the request. The TCP state, related to the established connection, is migrated from the front-end to the selected back-end web server. The main benefit of TCP handoff mechanism is that the back-end web server can send response packets directly to the client without routing outgoing packets back through the front-end node 450.

Streams-Based TCP/IP Implementation

STREAMS-based TCP/IP implementation offers a framework to implement the TCP rare-handoff mechanism as plug-in modules in the TCP/IP stack, in accordance with one embodiment of the present invention. The STREAMS-based TCP rare-handoff modules provide the advantage of better portability. Also, the STREAMS-based TCP rare-handoff modules are relatively independent of the original TCP/IP modules. In other words, STREAMS-based TCP rare-handoff modules do not change any data structures or field values maintained by the original TCP/IP modules. Further, all the interactions between TCP rare-handoff modules and the original TCP/IP modules are messaged based, such that, no direct function calls are made. This enables maximum portability, so that designed TCP rare-handoff modules can be ported to other STREAMS-based TCP/IP operating systems very quickly.

Another advantage provided by the STREAMS-based modules is increased flexibility within the operating system. The TCP rare-handoff modules may be dynamically loaded and unloaded as dynamically loadable kernel modules (DLKM) without service interruption. Improvements to the handoff mechanism are easily inserted as new TCP rare-handoff modules into the kernel of an operating system without modifying the operating system.

Furthermore, the STREAMS-based modules provide for increased efficiency when processing web requests, especially in handing off TCP states from one node to another. The TCP rare-handoff modules only peek into the TCP/IP message traffic. There is minimum functional replication of the original TCP/IP modules.

Also, the STREAMS-based modules allow for application transparency. The TCP rare-handoff mechanism operates at the kernel level within an operating system without any application layer involvement. Thus, no modifications at the application layer is necessary to perform TCP handoff. This is a valuable feature for applications where no source code is available.

Figure 5A:
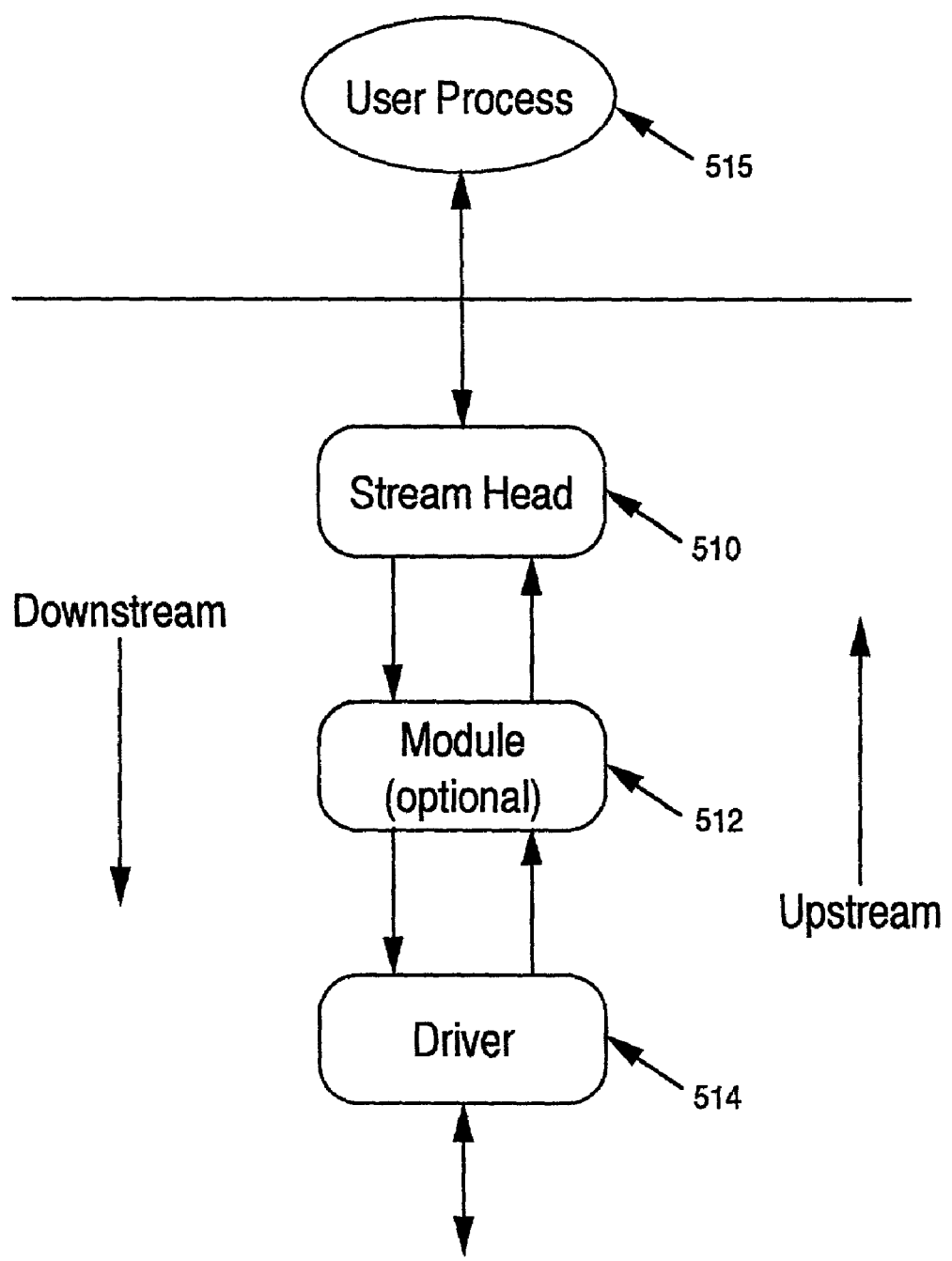
FIG. 5A illustrates a block diagram of an exemplary STREAM-based modular framework for TCP/IP implementation, in accordance with one embodiment of the present invention.

FIG. 5A illustrates a block diagram of a STREAMS-based modular framework for developing the TCP rare-handoff mechanism, in accordance with one embodiment of the present invention. Each stream generally has a stream head 510, a driver 514, and multiple optional modules 512 between the stream head 510 and the driver 514. These modules 512 exchange information through messages. Messages can flow in the upstream direction or the downstream direction.

Each module 512 has a pair of queues: a write queue and a read queue. When a message passes through a queue, the routine for this queue is called to process the message. The routine can drop a message, pass a message, change the message header, or generate a new message.

The stream head 510 is responsible for interacting with the user processes 515. The stream head 510 accepts requests from the user processes 515, translates them into appropriate messages, and sends the messages downstream. The stream head 510 is also responsible for signaling to the user processes module 515 when new data arrives or some unexpected event happens.

Figure 5B:
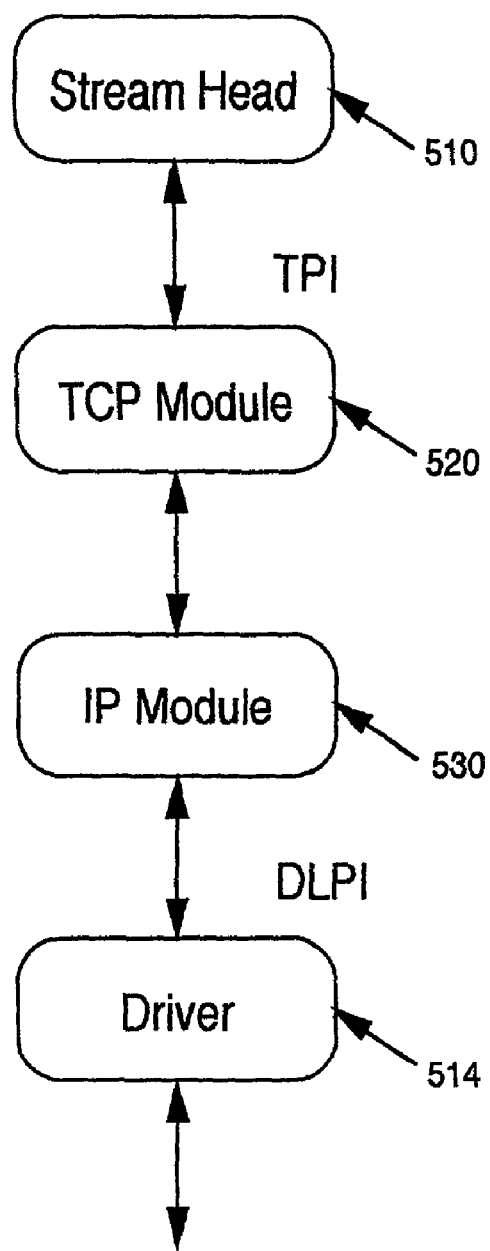
FIG. 5B illustrates a block diagram of the standard STREAMS-based modules used for TCP/IP implementation, in accordance with one embodiment of the present invention.

FIG. 5B illustrates a block diagram of the standard STREAMS-based modules used for TCP/IP STREAMS-based implementation, in accordance with one embodiment of the present invention. A transport provider interface (TPI) specification defines the message interface between the TCP module 520 and the stream head module 510. A data link provider interface (DLPI) specification defines the message interface between driver module 514 and the IP module 530. These two specifications, TPI and DLPI, can be implemented in individual STREAMS modules and define the message format, valid sequences of messages, and semantics of messages exchanged between these neighboring modules.

For example, when the TCP module 520 receives a SYN request for establishing the communication session, the TCP module 520 sends a "T_CONN_IND" message upstream. Under the TPI specification, the TCP module 520 should not proceed until it gets the response from the application layer. However, in one embodiment, in order to be compatible with Berkeley Software Distribution (BSD) implementation-based applications, the TCP module 520 continues the connection establishment procedure with the client. When the application decides to accept the connection, it sends the "T_CONN_RES" downstream on the listen stream. It also creates another stream to accept this new connection, and the TCP module 520 attaches a TCP connection state to this new stream. Data exchange continues on the accepted stream until either end closes the connection.

Web Site Cluster Design for a Rare-Handoff Architecture

As discussed previously, three main components comprise a web server cluster configuration in implementing a content-aware request distribution strategy: a dispatcher, a distributor, and a web server. The dispatcher implements the request distribution strategy and decides which web server will be processing a given request. The distributor interfaces with the client and implements the TCP handoff in order to distribute the client requests to a specific web server. The web server processes the client requests, or HTTP requests.

Figure 6:
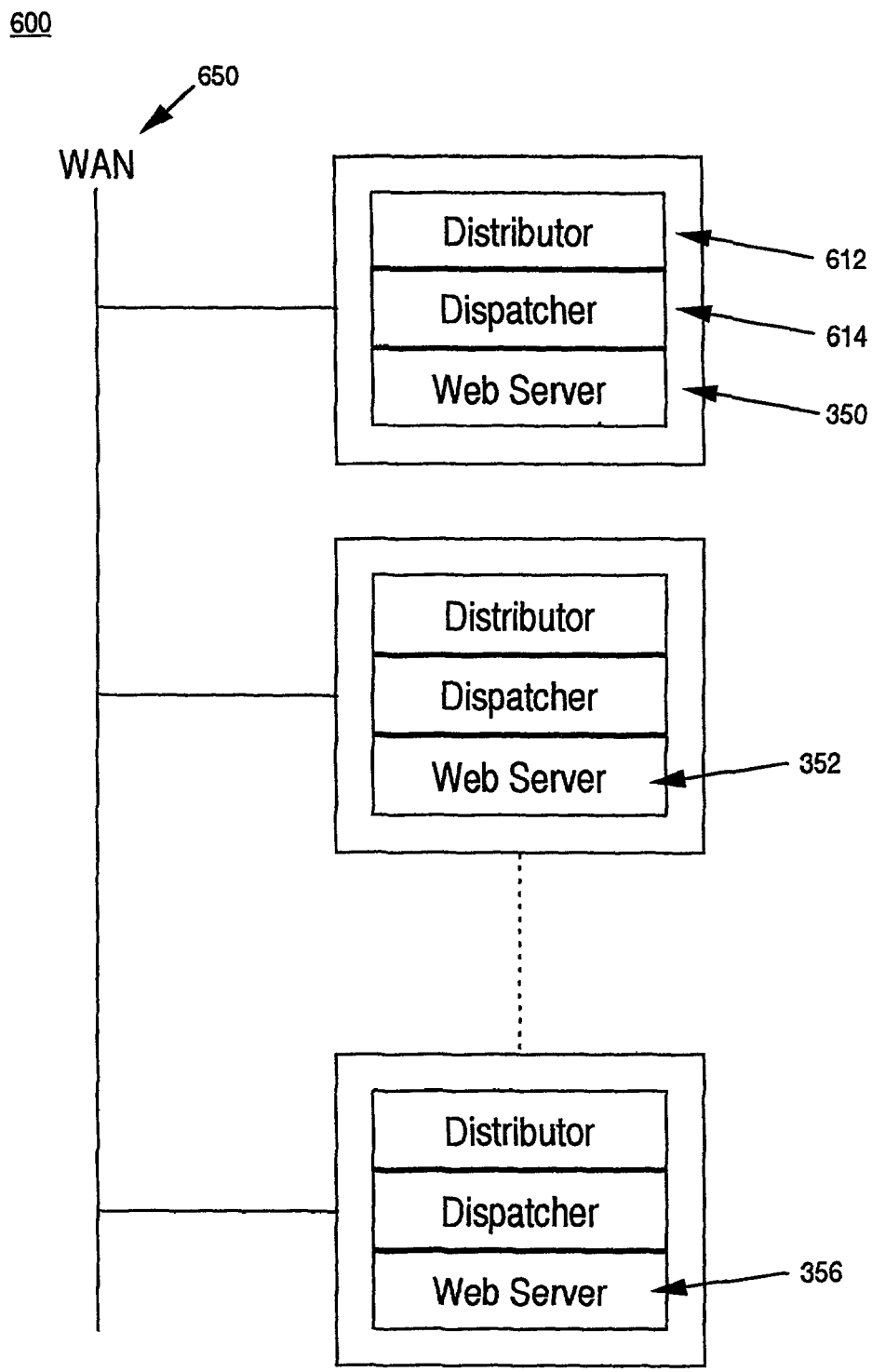
FIG. 6 illustrates a block diagram of an exemplary web server cluster environment including a plurality of homogeneous server computers, capable of implementing the TCP rare-handoff design, that are coupled through a wide area network, in accordance with one embodiment of the present invention.

FIG. 6 shows a cluster architecture 600 to support a network architecture implementing a TCP rare-handoff design, in accordance with one embodiment of the present invention. Web servers 450, 452, on up to 456 are connected by wide area network 650, in accordance with one embodiment of the present invention. In this architecture, the distributor component is co-located with the web server and dispatcher component (e.g., distributor 612, dispatcher 614, and web server 450 are co-located).

Figure 7:
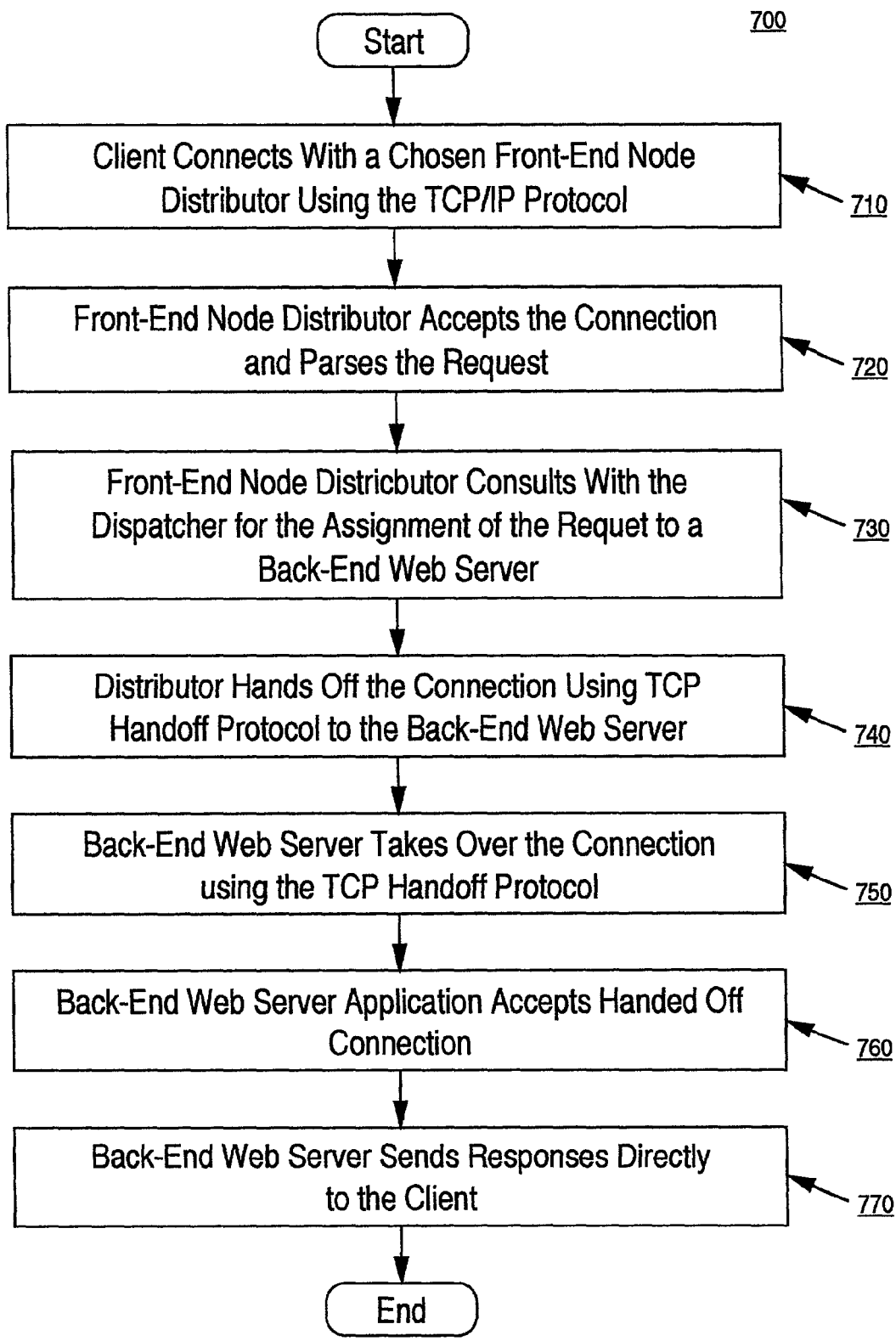
FIG. 7 is a flow chart of steps that illustrates a method for processing a typical client request in a TCP rare-handoff design, in accordance with one embodiment of the present invention.

In the TCP rare-handoff architecture design, for simplicity, it is assumed that the clients directly contact the distributor, for instance via Round-Robin DNS. Flow chart 700, of FIG. 7, illustrates a method for processing a typical client request in a TCP rare-handoff design, in accordance with one embodiment of the present invention. In this case, the client web browser uses TCP/IP protocol to connect to the chosen distributor in step 710. Then in step 720, the distributor component accepts the connection and parses the request. In step 730, the distributor contacts the dispatcher for the assignment of the request to a back-end web server that is not co-located with the distributor. In step 740, the distributor hands off the connection using TCP handoff protocol to the back-end web server chosen by the dispatcher. In step 750, the back-end web server takes over the connection using the hand-off protocol. In step 760, the web server application at the back-end web server accepts the created connection. In step 770, the back-end web server sends the response directly to the client.

The specifics of this cluster architecture is that each node in a cluster has the same functionality. As such, each node combines the function of a distributor front-end node and a back-end web server. In other words, each node could act as a front-end node and/or a back-end web server in providing TCP handoff functionality. For each web server, in the TCP rare-handoff architecture, most of the HTTP requests will be processed locally by the node accepting the connections, and hence TCP handoff happens relatively infrequently. Under such a usage pattern, the goal for the rare-TCP handoff design and implementation is a minimization of the overhead imposed by TCP handoff mechanism on local requests.

Modular TCP Rare-Handoff Design Architecture

The TCP rare-handoff design is optimized to minimize the overhead associated with introducing TCP handoff modules for transferring TCP states. The TCP rare-handoff architecture is optimized for local processing of web requests by initially creating TCP states at the correct location in the TCP/IP stack in the operating system of the node establishing communication with the client. However, optimizing for local processing of web request comes at a slight decrease in efficiency for remote processing of web requests.

The TCP handoff mechanism enables forwarding of responses from the back-end web server nodes directly to the clients without passing through the distributing front-end, in accordance with one embodiment of the present invention. In the CARD architecture, each node performs both front-end and back-end functionality. Also, the distributor is co-located with web server. For definition, the distributor-node accepting the original client connection request is referred as front-end (FE) node. In case the request has to be processed by a different node, the remotely located node that receives the TCP handoff request is referred to as the back-end (BE) node.

Figure 5C:
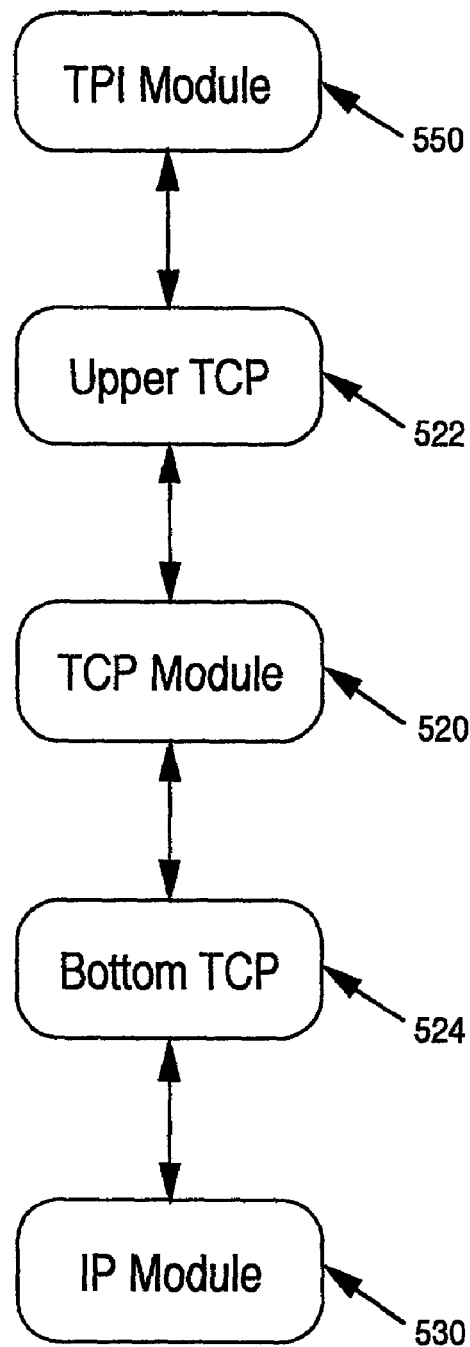
FIG. 5C illustrates a block diagram of new STREAMS-based plug-in modules used for TCP handoff in STREAMS-based TCP/IP implementation, in accordance with one embodiment of the present invention.

Two new modules are introduced to implement the functionality of TCP handoff as shown in FIG. 5C, in accordance with one embodiment of the present invention. According to the relative position in the existing TCP/IP stack, an upper TCP (UTCP) module 522 is introduced above the original TCP module 520 in the TCP/IP protocol stack. The module right under the TCP module 522 is the bottom TCP (BTCP) module 524. These two newly introduced modules provide a wrapper around the current TCP module 520.

Figure 8:
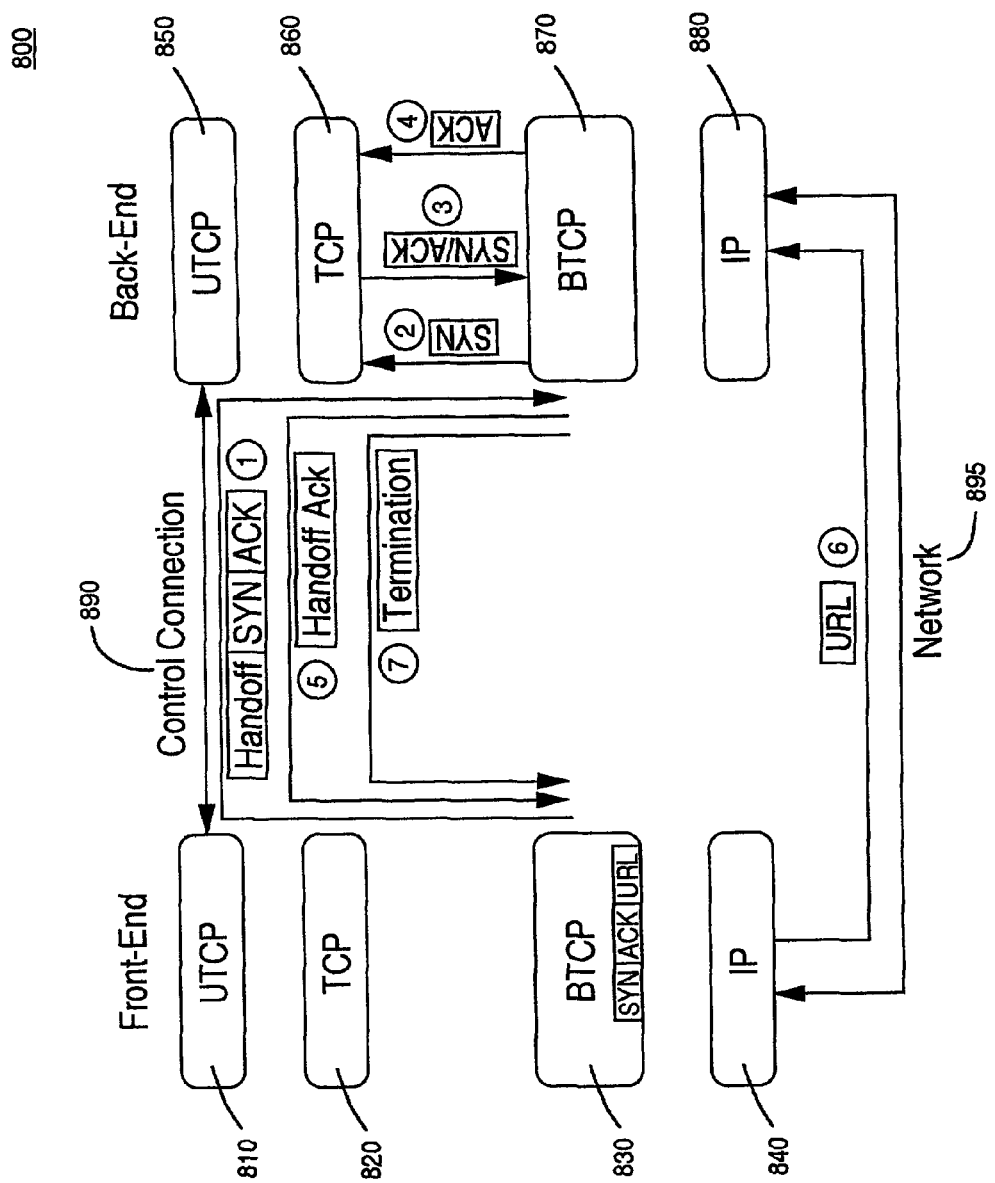
FIG. 8 illustrates a block diagram of an exemplary TCP rare-handoff architecture that shows the request processing flow during a TCP rare-handoff procedure, in accordance with one embodiment of the present invention.

FIG. 8 is a block diagram of the remote request processing flow for a TCP rare-handoff procedure in a network 800 between a front-end node and a back-end web server, in accordance with one embodiment of the present invention. The network 800 can be part of a larger network cluster comprising multiple computers. Every node or server computer in the web cluster is homogeneously structured in order to implement the TCP handoff mechanism. Each node can operate as a front-end node that receives a web request, or as a remotely located back-end web server node that receives a forwarded web request packet for processing the web request.

The TCP handoff modules of the front-end node are similar in structure to that illustrated in FIG. 5C and include the following: a UTCP$_{FE}$ module 810, a TCP$_{FE}$ module 820, a BTCP$_{FE}$ module 830, and an IP$_{FE}$ module 840. The TCP handoff modules of the selected back-end web server are similar in structure to that illustrated in FIG. 5C and include a UTCP$_{BE}$ module 850, a TCP$_{BE}$ module 860, a BTCP$_{BE}$ module 870, and an IP$_{BE}$ module 880. A reliable control connection that provides a persistent communication channel (control channel 890) couples both UTCP modules, UTCP$_{BE}$ 850 and UTCP$_{FE}$ 810. In another embodiment, the control channel can be a User Datagram Protocol (UDP) connection.

A network connection 895 provides further communication between nodes in the web cluster, including the front-end node and back-end web server as described in FIG. 8. The network connection can be over a LAN network, a WAN network, or any suitable communication network including the Internet.

A client web request received at a front-end node can be locally processed, or remotely processed at a selected back-end web server. In local processing, the front-end node accepting the request also is the node assigned to process the request. In remote processing, the front-end node accepting the request must handoff the request to a different back-end web server assigned to process this request.

Figure 9:
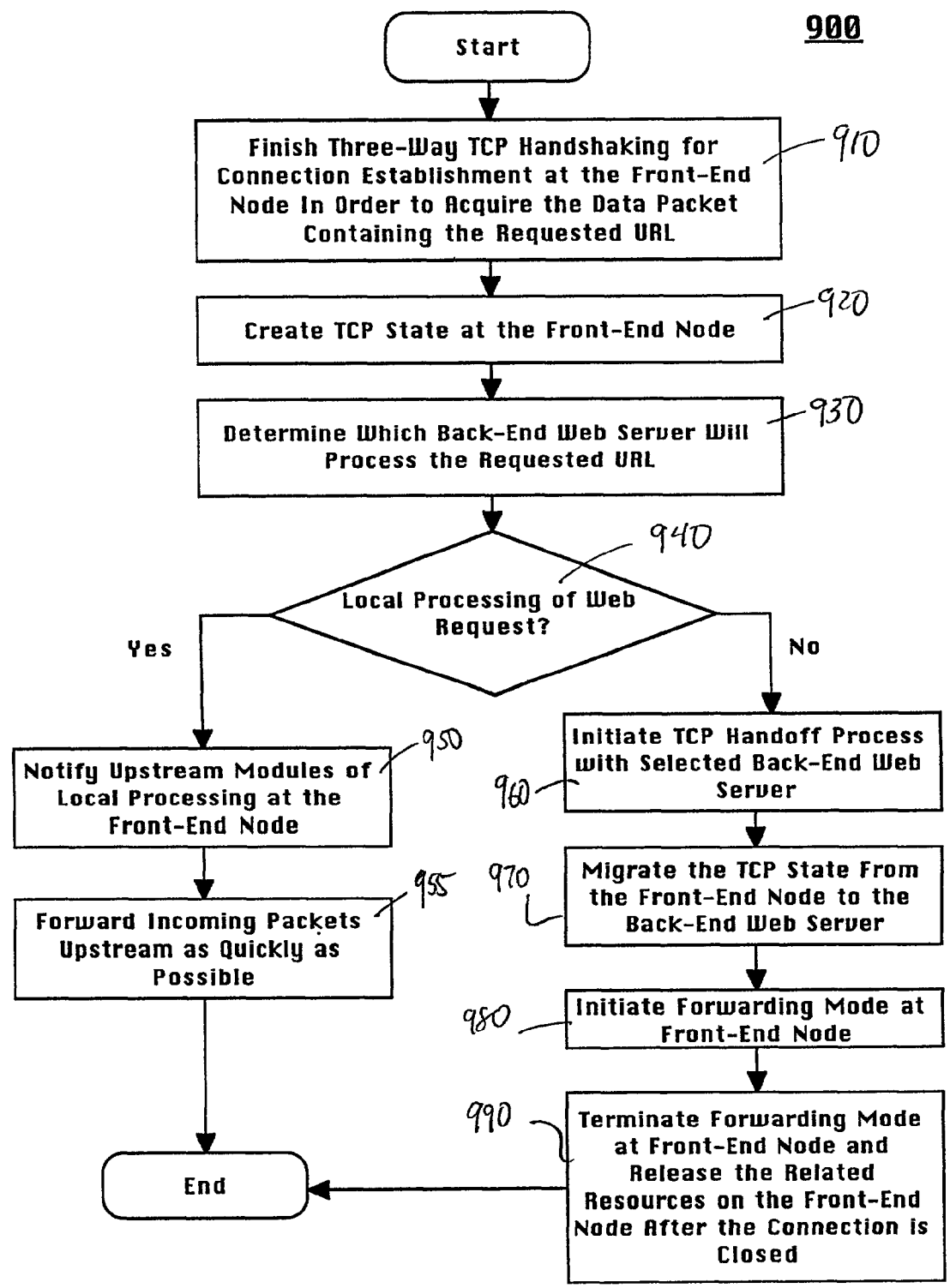
FIG. 9 is a flow diagram illustrating steps in a method for migrating TCP states from the front-end node to a selected back-end web server when web requests are processed at a remote back-end web server, in accordance with one embodiment of the present invention.

FIG. 9 is a flow chart 900 illustrating steps in a method for migrating TCP states from the front-end node to a selected back-end web server node when web requests are processed at a remote back-end web server, in accordance with one embodiment of the present invention. FIG. 9 illustrates the logical steps necessary for performing TCP handoff of the HTTP request in a TCP rare handoff implementation.

In step 910 of flow chart 900, the three way handshake is finished. This establishes a connection between a client and the front-end node in order to receive the HTTP request, as in step 920. In step 930, a routing decision is made to determine which back-end web server is assigned to process the request. In step 940, flow chart 900 determines if the request will be processed locally or remotely.

If the request will be handled locally, flow chart 900 proceeds to step 950, where the upstream modules are notified of the local processing at the front-end node. Thereafter, in step 955, any incoming packets from the client are sent upstream as quickly as possible for processing.

If the request will be handled remotely, flow chart 900 proceeds to step 960 where the TCP handoff modules at the front-end node initiate the TCP handoff process with the selected back-end web server. In step 970, the TCP state of the front-end node is migrated to the back-end web server. In step 980, the front-end node forwards any incoming data packets from the client to the back-end web server. In step 990, the TCP handoff modules terminate the forwarding mode at the front-end and release any related resources after the connection is closed.

Figure 10:
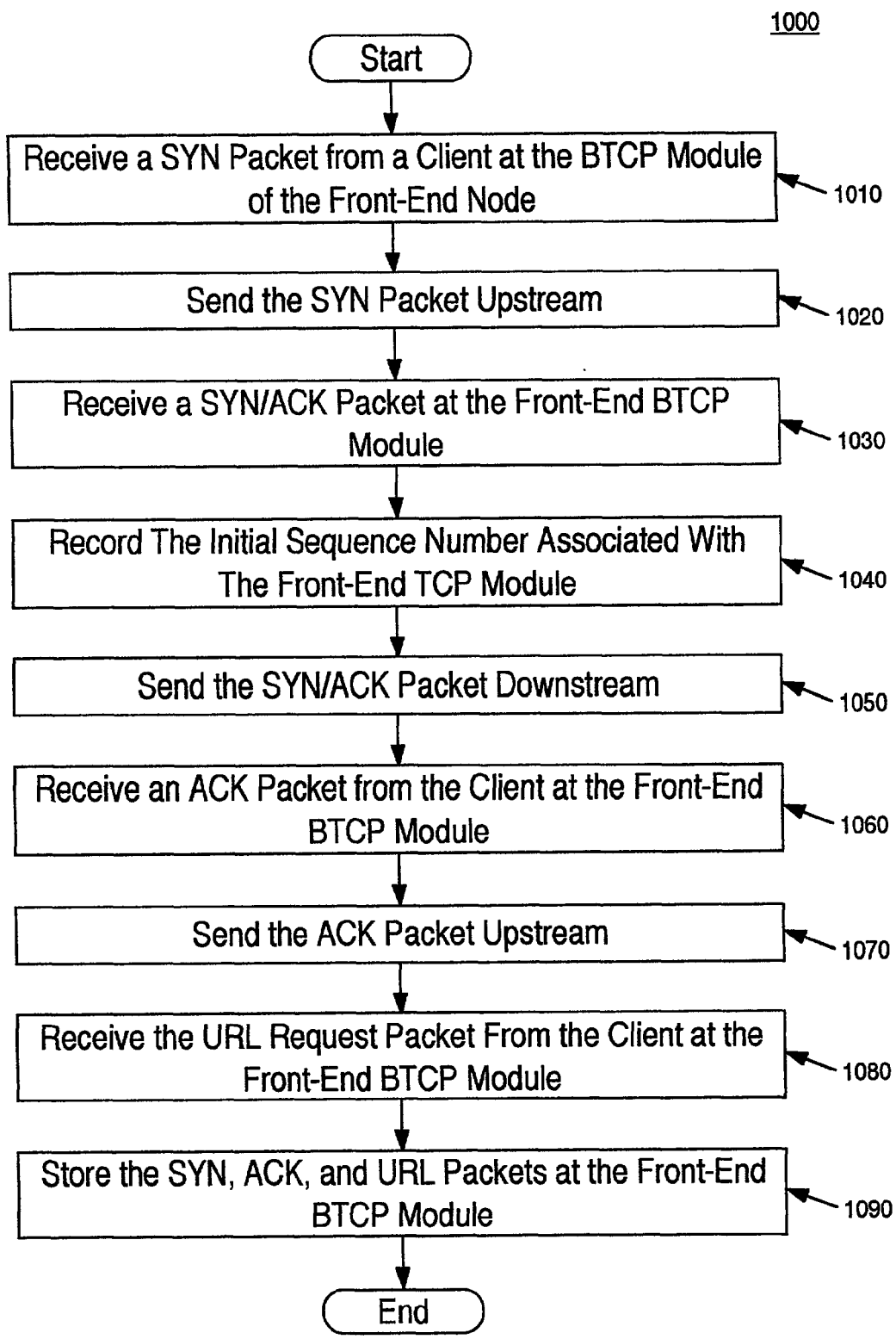
FIG. 10 is a flow diagram illustrating steps in a method for establishing a connection between a client and a front-end node, in accordance with one embodiment of the present invention.

FIG. 10 is a flow diagram illustrating steps in a method for establishing a connection setup between a client and a front-end node, in accordance with one embodiment of the present invention. Before the requested HTTP is sent to make a routing decision, the connection has to be established between the client and the front-end node. The TCP rare-handoff design incorporates the original TCP/IP modules in the current operating system to finish the three-way handshaking functionality.

In step 1010 of flow chart 1000, the bottom TCP (BTCP$_{FE}$) module at the front-end node allocates a connection structure corresponding to each connection request upon receiving a TCP SYN packet from the client. After that, BTCP$_{FE}$ sends the SYN packet upstream in step 1020.

In step 1030, the BTCP$_{FE}$ module receives a downstream TCP SYN/ACK packet from the TCP (TCP$_{FE}$) module at the front-end node. The BTCP$_{FE}$ records the initial sequence number of the TCP$_{FE}$ module that is associated with the connection in step 1040. Thereafter, the BTCP$_{FE}$ module sends the SYN/ACK packet downstream back to the client, in step 1050.

After the $BTCP_{FE}$ module receives ACK packet from the client in step 1060, it sends the packet upstream to $TC_{FE}$ in step 1070. In step 1080, the $BTCP_{FE}$ module receives the HTTP request from the client. During this entire process, the $BTCP_{FE}$ emulates the TCP state transition and changes its state accordingly.

In addition to monitoring the 3-way TCP handshaking, $BTCP_{FE}$ module keeps a copy of the incoming packets (SYN packet, ACK to SYN/ACK packet sent by the client) for TCP state migration purposes, in step 1090.

Also, because the TCP handoff should be transparent to server applications, the connection should not be exposed to the user level application before the routing decision is made. As such, the upper-TCP ($UTCP_{FE}$) intercepts the "T_CONN_IND" message sent by $TCP_{FE}$. The $TCP_{FE}$ continues the three-way handshaking connection protocol without waiting for explicit messages from the modules on top of $TCP_{FE}$.

Going back to step 1030 of flow chart 1000, the $BTCP_{FE}$ parses the request data packets from the client, which include the HTTP header. The $BTCP_{FE}$ retrieves the HTTP request, examines its content and makes the decision as to the routing of the web request.

In a TCP rare-handoff network architecture, a special communication channel is needed to initiate the TCP handoff between the front-end node and back-end web server. The control connection is a pre-established persistent connection as illustrated in FIG. 8 by control connection 890, and is created during the cluster initialization. Each node is connected to all other nodes in the cluster.

Figure 11:
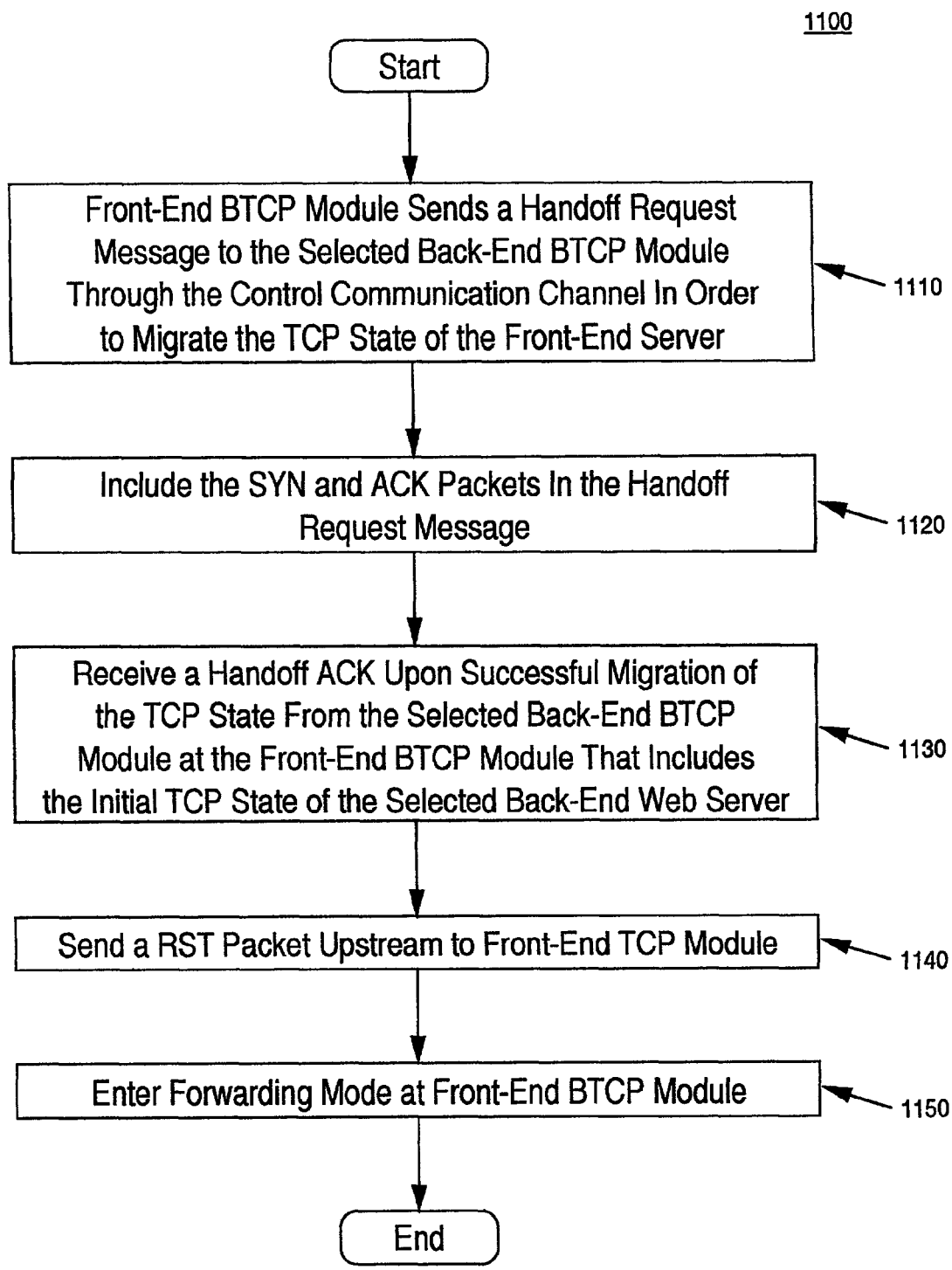
FIG. 11 is a flow diagram illustrating steps in a method for initiating and handing off the TCP state of the front-end node, in accordance with one embodiment of the present invention.

FIG. 11 is a flow diagram that in conjunction with FIG. 8 illustrate steps in a method for initiating and handing off the TCP state from the perspective of the front-end node, in accordance with one embodiment of the present invention.

In step 1110, the TCP handoff request is sent over the control connection by the $BTCP_{FE}$ module to initiate the handoff process with the selected back-end web server (see FIG. 8, step 1). Any communication between the $BTCP_{FE}$ module and the bottom-TCP ($BTCP_{BE}$) module at the back-end web server goes through the control connection by sending the message to their respective UTCP module first (see FIG. 8).

In step 1120, the SYN and ACK packets from the client and the TCP initial sequence number returned by $TCP_{FE}$ are included in the message. The $BTCP_{BE}$ uses the information in the handoff request to migrate the associated TCP state.

In step 1130, if the $BTCP_{BE}$ module successfully migrates the state, an acknowledgment is returned (FIG. 8, step 5) to the $BTCP_{FE}$ module using a proprietary protocol over the control channel.

In step 1140, the $BTCP_{FE}$ module frees the half-open TCP connection upon receiving the acknowledgment by sending a RST packet upstream to $TCP_{FE}$ module and enters into a forwarding mode in step 1150. The $UTCP_{FE}$ discards corresponding "T_CONN_IND" message when a "T_DISCON_IND" message is received from $TCP_{FE}$ in order to continue state migration.

Once a back-end web server is selected to service the web request, the connection for the communication session established by the web request must be extended or handed off to the selected back-end web server. However, it is difficult to retrieve the current state of a connection at the front-end, transfer the state to the back-end web server, and duplicate this TCP state at the TCP module at the back-end web server. First it is very hard to get the state out of the black box of the $TCP_{FE}$ module. Even if this could be done, it is very hard to replicate the state at the TCP ($TCP_{BE}$) module at the back-end web server. The TPI specification does not support schemes by which a new half-open TCP connection with a predefined state can be opened.

On the other hand, one embodiment of the present invention creates the half-open TCP connection by replaying the original connection packets to the TCP module ($TCP_{BE}$) at the selected back-end web server by the $BTCP_{FE}$. In a sense, the $BTCP_{BE}$ acts as a client to the $TCP_{BE}$ (see FIG. 8).

Figure 12:
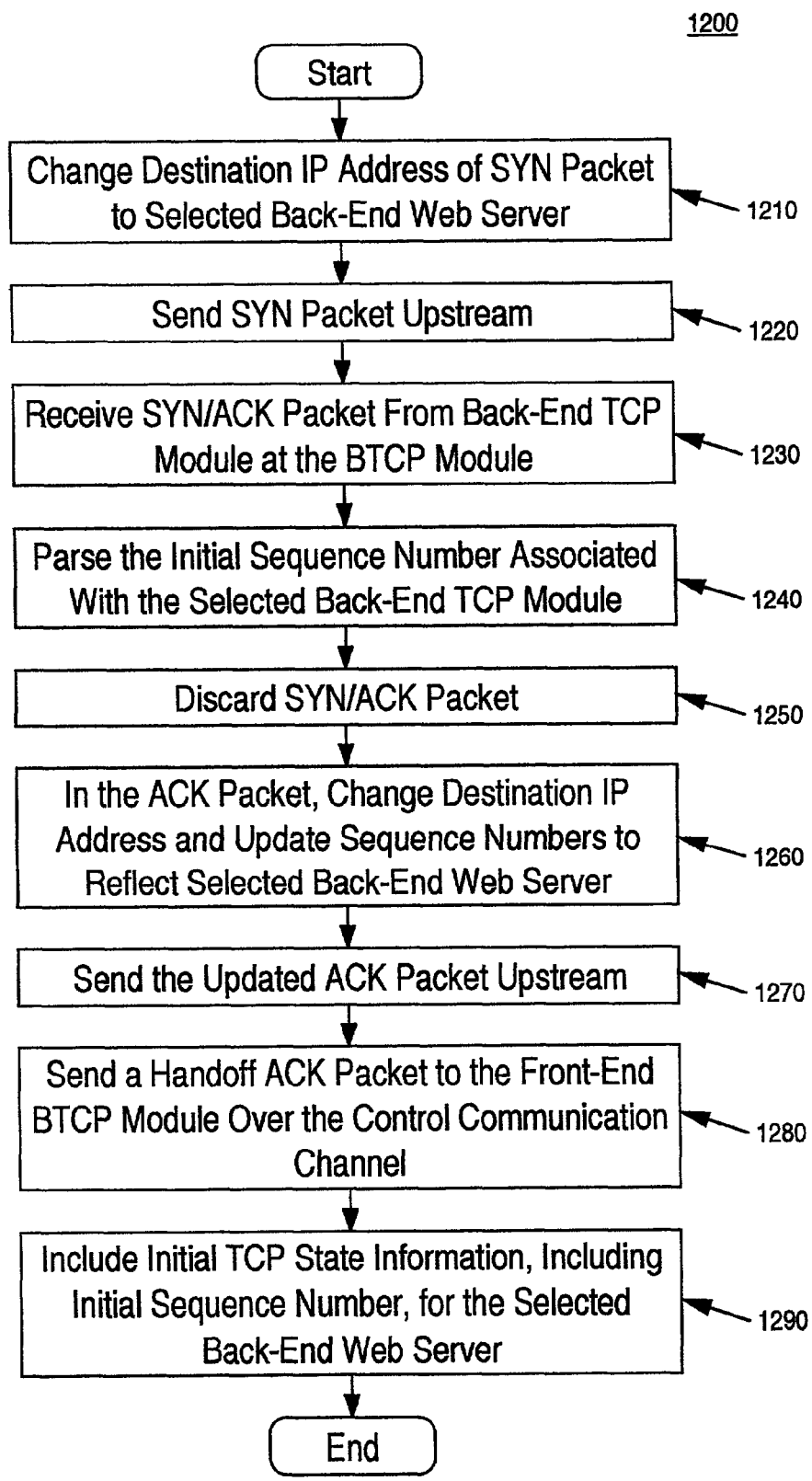
FIG. 12 is a flow diagram illustrating steps in a method for migrating the TCP state of the front-end node to the selected back-end web server, in accordance with one embodiment of the present invention.

FIG. 12 is a flow chart of steps that in conjunction with FIG. 8 illustrate steps in a method for extending the connection setup to a selected back-end web server from the perspective of the $BTCP_{BE}$ module, in accordance with one embodiment of the present invention.

In step 1210 of flow chart 1200, the $BTCP_{BE}$ module uses the packets from the $BTCP_{FE}$ module, and changes the destination IP address of SYN packet to the IP address of the back-end web server (FIG. 8, step 2). In step 1220, the $BTCP_{BE}$ sends the SYN packet upstream (FIG. 8, step 2).

The TCP ($TCP_{BE}$) module at the back-end web server responds with a TCP SYN/ACK message (FIG. 8, step 3). The $BTCP_{BE}$ parses the SYN/ACK packet for the initial sequence number associated with the $TCP_{BE}$ module, in step 1240. In step 1250, the $BTCP_{BE}$ records the initial sequence number of the $TCP_{BE}$ and discards the SYN-ACK packet.

In step 1260, the $BTCP_{BE}$ module updates the header of the ACK packet header properly, such that the destination IP address is changed to that of the selected back-end web server. Also, the TCP sequence numbers are updated to reflect that of the selected back-end web server (e.g., the TCP sequence number, and the TCP checksum). In step 1270, the $BTCP_{BE}$ sends the updated ACK packet upstream (FIG. 8, step 4).

In step 1280, the $BTCP_{BE}$ module sends a handoff acknowledgment packet back to the $BTCP_{FE}$ module over the control connection using a proprietary TCP handoff protocol. This acknowledgment packet notifies the front-end node that the TCP state was successfully migrated. Included within the handoff acknowledgment is the initial TCP state information for the selected back-end web server, as is specified in step 1290. Specifically, the initial sequence number for the $TCP_{BE}$ module is included.

After handoff is processed successfully, the $BTCP_{FE}$ module enters a forwarding mode. The $BTCP_{FE}$ module forwards all the pending data in $BTCP_{FE}$ module to the second $BTCP_{BE}$ module. All subsequent data packets are forwarded on this connection until the forward session is closed.

Figure 13:
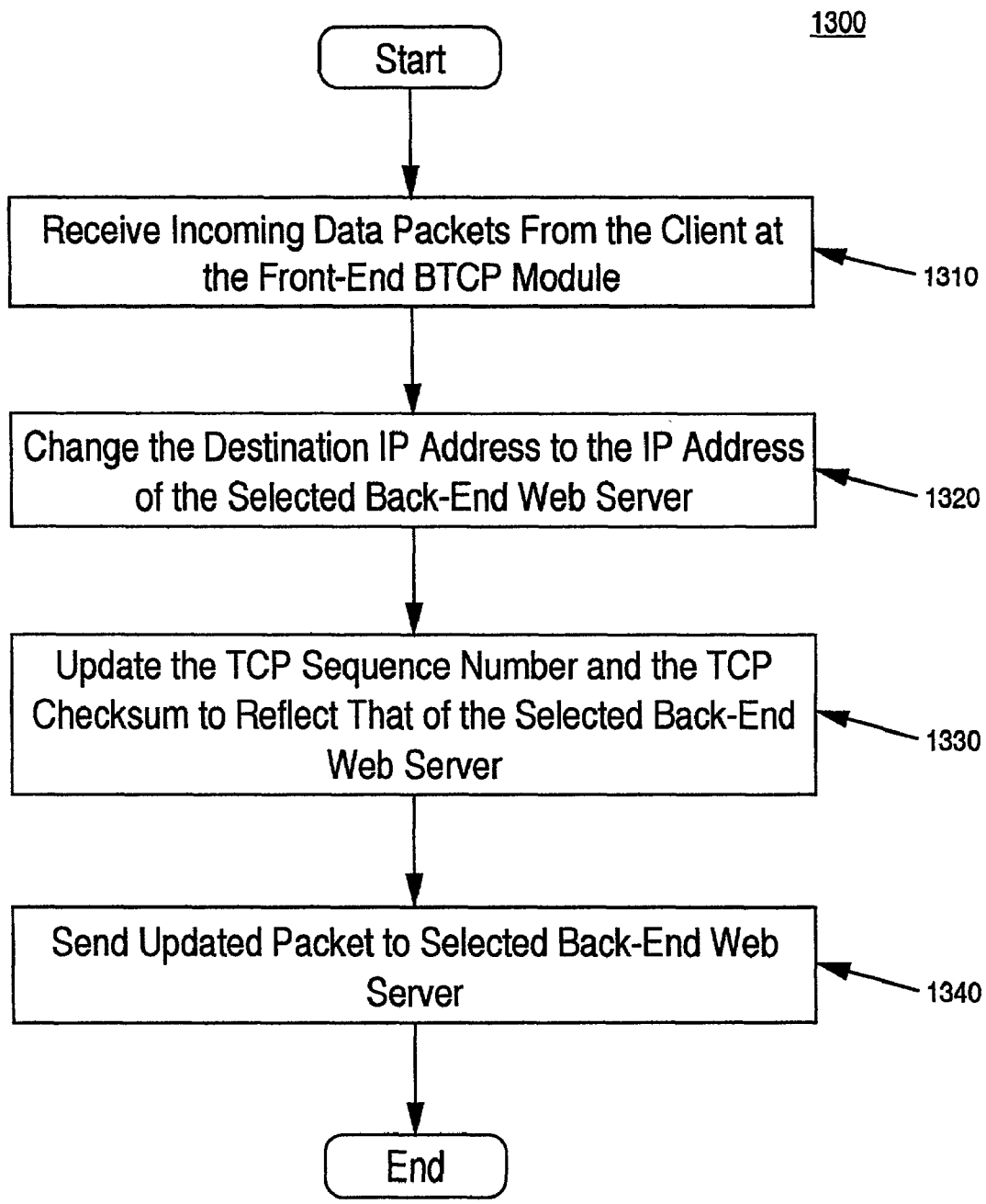
FIG. 13 is a flow diagram illustrating steps in a method for forwarding incoming traffic from the front-end node to the selected back-end web server, in accordance with one embodiment of the present invention.

FIG. 13 is a flow chart 1300 illustrating steps in a method for forwarding incoming traffic from the front-end node to the selected back-end web server, in accordance with one embodiment of the present invention. In step 1310, the $BTCP_{FE}$ module receives incoming data packets from the client.

During the data forwarding step, $BTCP_{FE}$ updates (corrects) the fields in the packet to reflect the selected back-end web server. In step 1320, the destination IP address is changed to the IP address of the selected back-end web server. In step 1330, the TCP sequence number, and the TCP checksum is updated to reflect that of the selected back-end web server. Then in step 1340, the $BTCP_{FE}$ forwards packets to the selected back-end web server through the network (see FIG. 8, step 6).

Packets may be forwarded to the selected server on top of the IP layer, in the IP layer, or under the IP layer, depending on the cluster configuration and the ratio between the local traffic and forwarding traffic. While the $BTCP_{FE}$ module may forward the packets on top of the IP layer, similar functionalities can be achieved by inserting a module on top of device driver.

It is appreciated that if the server cluster sits on a LAN, layer 2 forwarding may be used. In that case, the Media Access Control (MAC) address is used to identify the server without updating the IP address.

Figure 14:
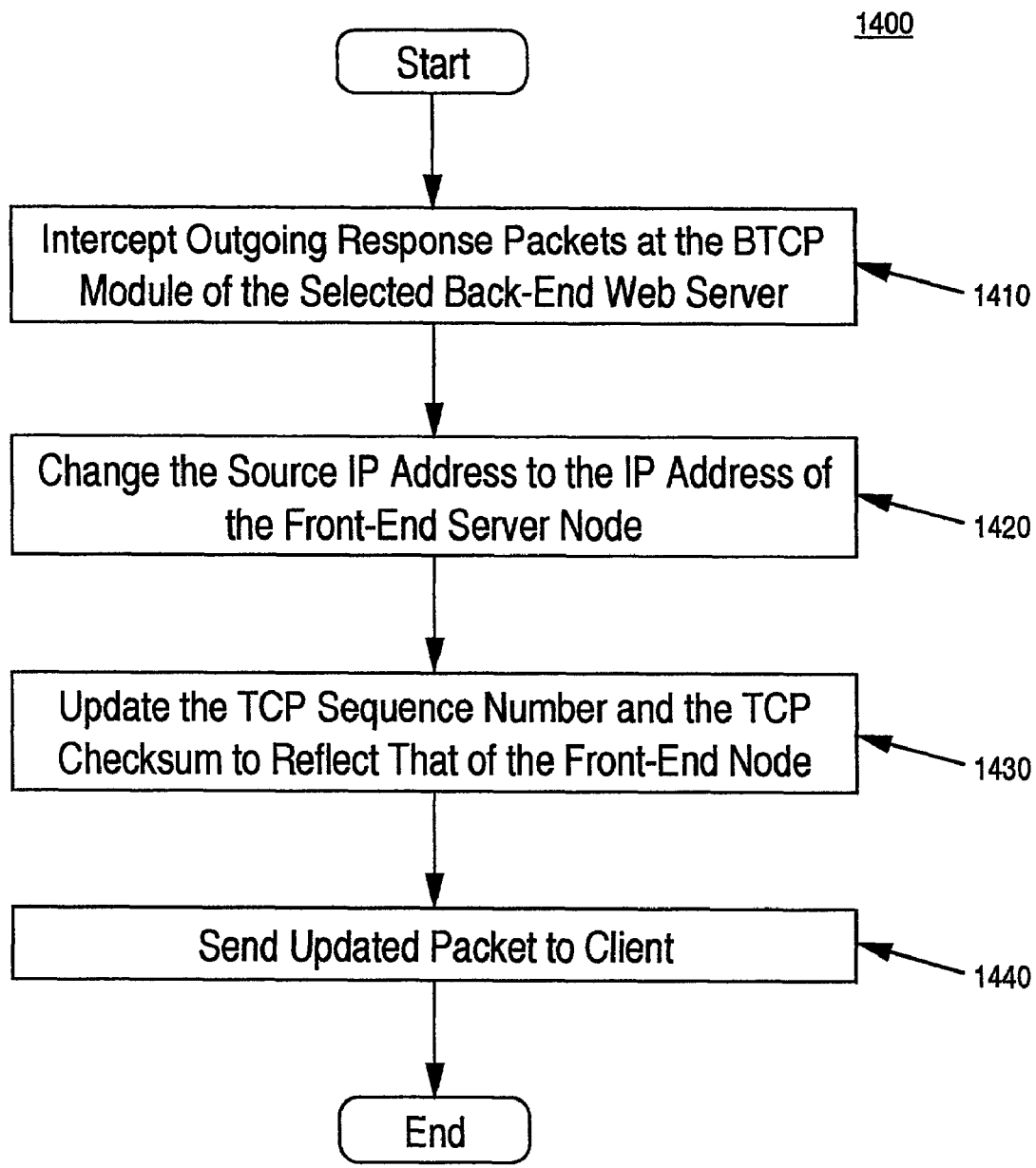
FIG. 14 is a flow diagram illustrating steps in a method for sending response packets from the selected back-end web server directly to the client, in accordance with one embodiment of the present invention.

FIG. 14 is a flow diagram illustrating steps in a method for sending response packets from the selected back-end web server directly to the client, in accordance with one embodiment of the present invention. The $BTCP_{BE}$ module updates (corrects) fields in the packet to reflect that of the front-end node.

In step 1410 of flow chart 1400, the $BTCP_{BE}$ module intercepts the outgoing response packets. In step 1420, the $BTCP_{BE}$ module changes the source address to the IP address of the front-end node. In step 1430, the $BTCP_{BE}$ module updates the TCP sequence number and the TCP checksum to reflect that of the front-end node. After that, the $BTCP_{BE}$ sends the packet downstream in step 1440.

The connection termination should free states at the back-end and front-end nodes. The data structures at the back-end web server are closed by the STREAMS mechanism. The $BTCP_{BE}$ monitors the status of the handoff connection and notifies the $BTCP_{FE}$ upon the close of the handoff connection in the $TCP_{BE}$ (see FIG. 8, step 7), in accordance with one embodiment of the present invention. This communication occurs over the control channel. The $BTCP_{FE}$ releases the resources related to the forwarding mechanism after receiving such a notification.

Local request processing is performed in the following way. After the $BTCP_{FE}$ module finds out that the request should be served locally, the $BTCP_{FE}$ notifies the $UTCP_{FE}$ to release the correct "T_CONN_IN" message to the upper STREAMS modules, in accordance with one embodiment of the present invention. Also the $BTCP_{FE}$ sends the data packet (containing the requested URL) to the $TCP_{FE}$ module. Then the $BTCP_{FE}$ discards all the packets kept for this connection and frees the data structures associated with this connection. Afterwards, the $BTCP_{FE}$ and the $UTCP_{FE}$ send packets upstream as quickly as possible. This guarantees the best performance for local request.

While the methods of embodiments illustrated in flow charts 700, 900, 1000, 1100, 1200, 1300, and 1400 show specific sequences and quantity of steps, the present invention is suitable to alternative embodiments.

Embodiments of the present invention, a method and system for a modular Transmission Control Protocol (TCP) rare-handoff design in a STREAMS-based Transmission Control Protocol/Internet Protocol (TCP/IP) implementation, is thus described. While the present invention has been described in particular embodiments, it should be appreciated that the present invention should not be construed as limited by such embodiments, but rather construed according to the below claims.

What is claimed is:

1. In a communication network, a method of TCP state migration comprising the steps of:
   a) establishing a TCP/IP communication session between a client computer and a first server computer, said first server computer part of a plurality of server computers forming a web cluster containing information, said communication session established for the transfer of data contained within said information;
   b) handing off, by sending a handoff request packet, said communication session to a selected server computer from said first server computer over a persistent control channel using TCP handoff modules that are dynamically loadable within TCP/IP stacks in operating systems located at both said first server computer and said selected server computer, wherein the TCP handoff modules implement a TCP handoff protocol that works within kernel levels of the operating systems, wherein said first server computer includes a first bottom TCP (BTCP) module, and said selected server computer includes a second BTCP module; and
   c) migrating a first TCP state of said first server computer to said selected server computer, and a second TCP state of said selected server computer to said first server computer over said control channel, wherein said migrating comprises migrating said first TCP state to said second BTCP module at said selected server computer over said control channel by including a first initial sequence number in said handoff request packet, such that said second BTCP module can calculate said first TCP state for said first server computer in said TCP/IP communication session.

2. The method as described in claim 1, wherein said step a) comprises the steps of:
   receiving a SYN packet from said client computer at said first BTCP module located at said first server computer;
   sending said SYN packet upstream to a first TCP module located above said first BTCP module in a first operating system of said first server computer;
   receiving a first SYN/ACK packet from said first TCP module;
   parsing said first TCP state from said first SYN/ACK packet, including said first initial sequence number for said first TCP module associated with said TCP/IP communication session;
   sending said SYN/ACK packet to said client computer;
   receiving an ACK packet from said client at said first BTCP module;
   sending said ACK packet to said first TCP module;
   receiving a web request packet associated with said TCP/IP communication session at said first BTCP module at said first server computer;
   storing said SYN packet, said ACK packet and said web request packet at said first server computer.

3. The method as described in claim 2, wherein said step b) comprises the steps of:
   examining content of said web request packet;
   determining which of said plurality of server computers can best process said web request packet, based on said content, wherein the server computer determined to be able to best process said web request packet is the selected server computer;
   sending the handoff request packet from said first BTCP module to said second BTCP module at said selected server computer over said control channel, if said selected server computer is not said first server computer;
   including said SYN packet and said ACK packet in said handoff request packet;
   changing a destination IP address of said SYN packet to a second IP address of said selected server computer, at said second BTCP module;
   sending said SYN packet from said second BTCP module to a second TCP module at said selected server computer;
   receiving a second SYN/ACK packet at said second BTCP module;
   parsing said second TCP state from said second SYN/ACK packet, including a second initial sequence number, for said second TCP module, that is associated with said TCP/IP communication session;

changing a destination IP address of said ACK packet to said second IP address, at said second BTCP module;

updating said ACK packet to reflect said second TCP state of said selected server computer in said communication session;

sending said ACK packet that is updated from said second BTCP module to said second TCP module; and sending a handoff acknowledgment message from said second BTCP module to said first BTCP module.

4. The method as described in claim 2, comprising the further steps of:

intercepting a connection indication message sent from said first TCP module to an application layer above said first TCP module at a first upper-TCP (UTCP) module at the first server computer, said connection indication message sent by said first TCP module upon establishing said communication session; and holding said connection indication message at said first UTCP module, wherein said first UTCP module and said first BTCP module provide a wrapper around said first TCP module.

5. The method as described in claim 4, wherein said method comprises the further steps of:

sending a reset packet from said first BTCP module upon receiving said handoff acknowledgment message to said first TCP module;

discarding said connection indication message at said first UTCP module;

receiving incoming data packets from said client at said first BTCP module;

changing destination addresses of said incoming data packets to said second IP address;

updating sequence numbers and TCP checksum in said data packets to reflect said second TCP state of said selected server computer; and forwarding said updated data packets to said selected server computer.

6. The method as described in claim 4, comprising the further steps of:

sending notification from said first BTCP module to said first UTCP module to release said connection indication message, if said selected server computer is said first server computer;

sending incoming data packets, including said web request packet, from said client computer, received at said first BTCP module, upstream.

7. The method as described in claim 4, wherein the first BTCP module and first UTCP module are dynamically loadable kernel modules.

8. The method as described in claim 2, comprising the further steps of:

intercepting outgoing response packets from said selected server computer at a second bottom TCP (BTCP) module located at said selected server computer;

changing, by the second BTCP module, source addresses of said response packets to a first IP address of said first server computer;

updating, by the second BTCP module, sequence numbers and TCP checksum in said response packets to reflect said first TCP state of said first server computer; and sending said updated response packets to said client computer without passing the updated response packets through the first server computer.

9. The method as described in claim 8, comprising the further steps of:

monitoring TCP/IP control traffic for said communication session at said second BTCP module;

understanding when said communication session is closed at said selected server computer;

sending a termination message to said first server computer over said control channel;

terminating said TCP/IP communication session at said first server computer by terminating a forwarding mode at said first BTCP module; and freeing data resources associated with said communication session at said first server computer.

10. The method as described in claim 1, wherein step c) comprises: migrating a second TCP state of said selected server computer to said first BTCP module by including said second initial sequence number in a handoff acknowledgment message, such that said first BTCP module can calculate said second TCP state for said selected server computer in said TCP/IP communication session.

11. The method as described in claim 1, wherein the TCP handoff modules are dynamically loadable kernel modules, the method further comprising:

dynamically loading the TCP handoff modules in the corresponding first server computer and selected server computer without modifying the operating systems of the respective first server computer and selected server computer.

12. In a communication network, a method of TCP state migration comprising the steps of:

a) establishing a TCP/IP communication session between a client computer and a first server computer, said first server computer part of a plurality of server computers forming a web cluster containing information, said communication session established for the transfer of data contained within said information;

b) monitoring traffic associated with establishing said TCP/IP communication session to understand a first initial TCP state of said first server computer associated with said TCP/IP communication session, at a first bottom-TCP (BTCP) module at said first server computer, wherein said first BTCP module is a dynamically loadable kernel module (DLKM) loaded in said first server computer without modifying a first operating system of said first server computer;

c) receiving a web request associated with said TCP/IP communication session at said first BTCP module at said first server computer;

d) examining content of said web request;

e) determining which of said plurality of server computers, a selected server computer, can best process said web request, based on said content;

f) handing off said communication session to said selected server computer from said first server computer over a persistent control channel, if said selected server computer is not said first server computer;

g) monitoring traffic associated with handing off said TCP/IP communication session to understand a second initial TCP state of said selected server computer associated with said TCP/IP communication session, at a second BTCP module at said selected server computer, wherein said second BTCP module is a DLKM loaded in said selected server computer without modifying a second operating system of said selected server computer;

h) migrating said first initial TCP state to said selected server computer over said control channel, such that said second BTCP module can calculate a first TCP state for said first server computer in said TCP/IP communication session;

i) sending a second initial TCP state of said selected server computer to said first BTCP module, such that said first BTCP module can calculate a second TCP state for said selected server computer in said TCP/IP communication session;

j) forwarding data packets received at said first BTCP module from said client to said selected server computer, by changing said data packets to reflect said second TCP state and a second IP address of said selected server computer;

k) sending response packets from said selected server computer directly to said client computer by changing said response packets to reflect said first TCP state and a first IP address of said first server computer; and l) terminating said TCP/IP communication session at said first server computer when said TCP/IP communication session is closed.

13. The method as described in claim 12, wherein said steps a) and b) comprise the steps of:
receiving a SYN packet from said client computer at said first BTCP module;
sending said SYN packet upstream to a first TCP module located above said first BTCP module in said first operating system of said first server computer;
receiving a first SYN/ACK packet from said first TCP module;
parsing, by the first BTCP module, said first initial TCP state from said first SYN/ACK packet, including a first initial sequence number for said first TCP module associated with said TCP/IP communication session;
sending said SYN/ACK packet to said client computer;
receiving, by the first BTCP module, an ACK packet from said client computer at said first BTCP module;
sending said ACK packet to said first TCP module;
storing said SYN packet, said ACK packet and said web request at said first server computer.

14. The method as described in claim 13, wherein said steps f) and g) comprise the steps of:
sending a handoff request packet from said first BTCP module to said second BTCP module over said control channel;
including said SYN packet and said ACK packet in said handoff request packet;
changing a destination IP address of said SYN packet to a second IP address of said selected server computer, at said second BTCP module;
sending, by said second BTCP module, said SYN packet to a second TCP module at said selected server computer;
receiving a second SYN/ACK packet at said second BTCP module;
parsing said second initial TCP state from said second SYN/ACK packet, including a second initial sequence number, for said second TCP module, that is associated with said TCP/IP communication session;
changing a destination IP address of said ACK packet to said second IP address, at said second BTCP module;
updating said ACK packet to reflect said second TCP state of said selected server computer in said communication session;
sending said ACK packet that is updated from said second BTCP module to said second TCP module; and
sending a handoff acknowledgment message from said second BTCP module to said first BTCP module.

15. The method as described in claim 14, wherein said ACK packet includes said first initial TCP state of said first server computer.

16. The method as described in claim 14, wherein said handoff acknowledgment message includes said second initial sequence number.

17. The method as described in claim 14, comprising the further steps of:
intercepting a connection indication message sent from said first TCP module to an application layer above said first TCP module at a first upper-TCP (UTCP) module at said first server computer, said connection indication message sent by said first TCP module upon establishing said communication session; and
holding said connection indication message at said first UTCP module, wherein said first UTCP module and said first BTCP module provide a wrapper around said first TCP module.

18. The method as described in claim 17, comprising the further steps of:
sending a reset packet from said first BTCP module upon receiving said handoff acknowledgment message to said first TCP module;
discarding said connection indication message at said first UTCP module;
receiving incoming data packets from said client at said first BTCP module;
changing destination addresses of said incoming data packets to said second IP address;
updating sequence numbers and TCP checksum in said data packets to reflect said second TCP state of said selected server computer; and
forwarding said updated data packets to said selected server computer.

19. The method as described in claim 17, comprising the further steps of:
sending notification from said first BTCP module to said first UTCP module to release said connection indication message, if said selected server computer is said first server computer; and
sending incoming data packets, including said web request, from said client computer, received at said first BTCP module, upstream.

20. The method as described in claim 12, wherein step k) comprises the steps of:
intercepting outgoing response packets from said selected server computer at said second BTCP module;
changing, by said second BTCP module, source addresses of said response packets to said first IP address;
updating, by said second BTCP module, sequence numbers and TCP checksum in said response packets to reflect said first TCP state of said first server computer; and
sending said updated response packets to said client computer without passing the updated response packets through said first server computer.

21. The method as described in claim 12, wherein step l) comprises the steps of:
monitoring TCP/IP control traffic for said communication session at said second BTCP module;
understanding when said communication session is closed at said selected server computer;
sending a termination message to said first server computer over said control channel;
terminating a forwarding mode at said first BTCP module; and
freeing data resources associated with said communication session at said first server computer.

22. The method as described in claim 12, wherein each of said plurality of server computers is constructed similarly including BTCP modules located downstream from respective TCP modules in the corresponding server computers, and UTCP modules located upstream from the corresponding TCP modules, wherein each pair of the BTCP modules and UTCP modules provides a wrapper around a corresponding TCP module.

23. The method as described in claim 22, wherein said control channel allows for communication between all UTCP modules of the corresponding server computers.

24. The method as described in claim 12, wherein said plurality of server computers is coupled together over a wide area network in said communication network.

25. The method as described in claim 12, wherein said information is partitioned/partially replicated throughout each of said plurality of server computers.

26. A first server computer comprising:
at least one processor;
an operating system executable on the at least one processor;
a TCP module in the operating system;
a first upper TCP (UTCP) module located above the TCP module in the operating system of said first server computer;
a first bottom TCP (BTCP) module located below said TCP module, wherein said first UTCP, TCP, and first BTCP modules implement handing off a communication session between the first server computer and a second node, wherein the first BTCP and first UTCP modules are dynamically loadable kernel modules (DLKMs) that are dynamically loadable and unloadable in said first server computer without modifying the operating system,
wherein said communication session is established between a client computer and said first server computer, said first server computer part of a plurality of server computers including said second node forming a cluster that contains information, said communication session established for the transfer of data contained within said information;
wherein said first BTCP module is configured to:
receive a web request associated with said TCP/IP communication session:
examine content of said web request;
determine which of said plurality of server computers can best process said web request, based on said content, wherein the server computer determined to be able to best process said web request is the second node;
hand off said communication session to said second node from said first server computer over a persistent control channel, if said second node is not said first server computer, wherein the handing off causes migration of a first TCP state of said first server computer to the second node, and migration of a second TCP state of said second node to the server computer.

27. The first server computer as described in claim 26, wherein said first BTCP module is configured to further:
receive a SYN packet from said client computer;
send said SYN packet upstream to said TCP module;
receive a first SYN/ACK packet from said TCP module;
parse a first initial TCP state from said first SYN/ACK packet, including a first initial sequence number for said TCP module associated with said TCP/IP communication session;
send said SYN/ACK packet to said client computer;
receive an ACK packet from said client computer;
send said ACK packet to said TCP module.

28. The first server computer as described in claim 27, wherein said first BTCP module is configured to further:
send a handoff request packet to a second BTCP module over said control channel, said second BTCP module located below a second TCP module in a second operating system at said second node;
include said SYN packet and said ACK packet in said handoff request packet;
receive a handoff acknowledgment message from said second BTCP module.

29. The first server computer as described in claim 28, wherein said first UTCP module is configured to:
intercept a connection indication message sent from said TCP module to an application layer above said TCP module, said connection indication message sent by said TCP module upon establishing said communication session; and
hold said connection indication message.

30. The first server system as described in claim 29, wherein said first BTCP module is configured to further:
send a reset packet upon receiving said handoff acknowledgment message to said TCP module;
receive incoming data packets from said client computer;
change destination addresses of said incoming data packets to a second IP address of said second node;
update sequence numbers and TCP checksum in said data packets to reflect said second TCP state of said second node; and
forward said updated data packets to said second node.

31. The first server computer as described in claim 29, wherein said first BTCP module is configured to further:
send notification to said first UTCP module to release said connection indication message, if said second node is said first server computer;
send incoming data packets, including said web request, from said client computer, received at said first BTCP module, upstream.

32. The first server computer as described in claim 26, wherein said first BTCP module is configured to:
receive a handoff request from a second BTCP module located at a second server computer over a persistent control channel, said second server computer having established a second communication session with a second client computer, said handoff request including a SYN packet and an ACK packet, said SYN packet and ACK packet used for establishing said second communication session between said second client computer and said second server computer, said ACK packet including a first initial TCP state including a first initial TCP sequence number of said second server computer in said communication session;
change a destination IP address of said SYN packet to a first IP address of said first server computer;
send said SYN packet to said TCP module;
receive a SYN/ACK packet;
parse a second initial TCP state from said SYN/ACK packet, including a second initial sequence number, for said TCP module;
change a destination IP address of said ACK packet to said first IP address;
update said ACK packet to reflect said second TCP state;
send said ACK packet that is updated to said TCP module; and
send a handoff acknowledgment message to said second BTCP module over said control channel.

* * * * *

UNITED STATES PATENT AND TRADEMARK OFFICE
CERTIFICATE OF CORRECTION

PATENT NO.       : 7,831,731 B2                                            Page 1 of 1
APPLICATION NO.  : 09/880631
DATED            : November 9, 2010
INVENTOR(S)      : Wenting Tang et al.

It is certified that error appears in the above-identified patent and that said Letters Patent is hereby corrected as shown below:

In column 21, line 39, in Claim 26, delete "session:" and insert -- session; --, therefor.

In column 21, line 46, in Claim 26, delete "hand off" and insert -- handoff --, therefor.

In column 22, line 17, in Claim 30, delete "system" and insert -- computer --, therefor.

Signed and Sealed this
Twenty-fifth Day of October, 2011

David J. Kappos
*Director of the United States Patent and Trademark Office*